United States Patent
Szum et al.

(10) Patent No.: US 6,169,126 B1
(45) Date of Patent: Jan. 2, 2001

(54) RADIATION-CURABLE OPTICAL FIBER PRIMARY COATING SYSTEM

(75) Inventors: David M. Szum, Elmhurst; Chander P. Chawla, Batavia; James R. Petisce, West Dundee; George Pasternack, Riverwoods; Timothy E. Bishop, Algonquin; Paul E. Snowwhite, Elgin; Edward P. Zahora, Naperville, all of IL (US)

(73) Assignee: DSM N.V., Heerlen (NL)

( * ) Notice: Under 35 U.S.C. 154(b), the term of this patent shall be extended for 0 days.

(21) Appl. No.: 09/353,659

(22) Filed: Jul. 15, 1999

Related U.S. Application Data

(62) Division of application No. 09/082,548, filed on May 21, 1998.

(51) Int. Cl.$^7$ .................................................... C08F 2/48
(52) U.S. Cl. ............................ 522/160; 522/90; 522/157; 522/158; 522/150; 428/378; 428/380; 428/383
(58) Field of Search ............................... 522/90, 99, 172, 522/148, 150, 160, 158, 157; 427/508, 513; 428/378, 380, 383

(56) References Cited

U.S. PATENT DOCUMENTS

| | | |
|---|---|---|
| 3,984,172 | 10/1976 | Miller . |
| 4,472,021 | 9/1984 | Ansel et al. . |
| 4,474,830 | 10/1984 | Taylor . |
| 4,496,210 | 1/1985 | Ansel et al. . |
| 4,636,223 | 1/1987 | Mehl et al. . |
| 4,660,927 | 4/1987 | Kondow et al. . |
| 4,900,126 | 2/1990 | Jackson et al. . |
| 4,913,859 | 4/1990 | Overton et al. . |
| 5,011,260 | 4/1991 | Marx et al. . |
| 5,033,335 | 7/1991 | Yatsu et al. . |
| 5,037,763 | 8/1991 | Petisce . |
| 5,146,531 | 9/1992 | Shustack . |
| 5,219,896 | 6/1993 | Coady et al. . |
| 5,227,410 | 7/1993 | Eckberg et al. . |
| 5,240,971 | 8/1993 | Eckberg et al. . |
| 5,302,627 | 4/1994 | Fields et al. . |
| 5,304,627 | 4/1994 | Field et al. . |
| 5,336,563 | 8/1994 | Coady . |
| 5,352,712 * | 10/1994 | Shustack ............................. 522/31 |
| 5,373,578 | 12/1994 | Parker . |
| 5,379,363 | 1/1995 | Bonicel et al. . |
| 5,384,342 | 1/1995 | Szum . |
| 5,473,720 | 12/1995 | Ali et al. . |
| 5,492,733 | 2/1996 | D'Anna et al. . |
| 5,502,145 | 3/1996 | Szum . |
| 5,787,218 * | 7/1998 | Ohtaka et al. ........................ 385/123 |

FOREIGN PATENT DOCUMENTS

| | | |
|---|---|---|
| 2171504 | 9/1996 | (CA) . |
| 4302327 | 8/1994 | (DE) . |
| 0104864 A2 | 4/1984 | (EP) . |
| 0104864 B1 | 4/1984 | (EP) . |
| 0116140 | 8/1984 | (EP) . |
| 0260842 | 3/1988 | (EP) . |
| 0307218 | 3/1989 | (EP) . |
| 0407004 | 1/1991 | (EP) . |
| 407 004 | 1/1991 | (EP) . |
| 537 266 | 12/1991 | (EP) . |
| 0535828 | 4/1993 | (EP) . |
| 0565798 | 10/1993 | (EP) . |
| 780 712 | 3/1996 | (EP) . |
| 0732625 | 9/1996 | (EP) . |
| 0780712 | 6/1997 | (EP) . |
| 0527266 | 2/1998 | (EP) . |
| 0262340 A2 | 4/1998 | (EP) . |
| 58-115402 | 7/1983 | (JP) . |
| 59-074506 | 4/1984 | (JP) . |
| 30-35210 | 2/1991 | (JP) . |
| 8-143806 | 8/1996 | (JP) . |
| 95/23772 | 9/1995 | (WO) . |
| 96/11965 | 4/1996 | (WO) . |
| 96/12749 | 5/1996 | (WO) . |
| 96/23828 | 8/1996 | (WO) . |
| 96/30182 | 10/1996 | (WO) . |
| 98 21 157 | 5/1998 | (WO) . |

OTHER PUBLICATIONS

Mills, G., "Testing of 4– And 8– Fiber Ribbon Strippability", 427 International Wire & Cable Symposium Proceedings (1992).

Toler, et al., "Factors Affecting Mechanical Stripping Of Polymer Coatings From Optical Fibers", International Wire & Cable Symposium Proceedings (1989).

"Union Carbide ® Organofunctional Silane Products and Applications" (1991, 1992).

Blyler, et al.., "Coatings and Jackets", *Optical Fiber Telecommunications*, 1979, Chapter 10, pp. 299–341.

Wu, *Polymer Interface Adhesion*, Marcel Dekker, 1982, pp. 406–434.

"Release Agents", *Encyclopedia of Polymer Science*, $2^{nd}$ Ed., vol. 14, Wiley–Interscience, 1988, pp. 411–421.

Jackson, et al., "An Enhanced Ribbon Structure For High Fiber Count Cables In The Loop", International Wire & Cable Symposium Proceedings (1989), 569–573.

Gadonna, et al., "Methods For The Characterization Of The State Of Fibre Primary Coating", EFOC & N, $10^{th}$ Annual Conference, Paris (1992).

Jackson, et al., "Design And Performance Of Compact 204–Fiber Ribbon Cable", Optical Fiber Communication Conference (1990).

(List continued on next page.)

Primary Examiner—James J. Seidleck
Assistant Examiner—Sanza L. McClendon
(74) Attorney, Agent, or Firm—Pillsbury Madison & Sutro

(57) ABSTRACT

Optical fiber primary coating systems are disclosed having excellent ribbon stripping and adhesion behavior. The coatings are radiation-curable. The excellent stripping and adhesion behavior can be inner primary coating composition having a slip enhancing component and a high modulus outer primary coating composition. Combination of means can be employed. Stripping behavior can be measured by crack propagation and fiber friction measurements.

4 Claims, No Drawings

OTHER PUBLICATIONS

Kohtala, et al., "Optical Fiber Ribbon Cable Manufacture", Wire Industry, Oct. 1991, pp. 627–630.

Schmid, et al., "The Effect Of UV Curable Secondary Buffers On The Strippability Of Commercially Available Fibers", Wire Journal International (1991) pp. 63–66.

Apicella, et al., Adhesion of Coatings On Glass: A New Measurement Method, EFOC Proceedings, (1991) pp. 100–104.

Yuce, et al., "The Effect Of Coating Cure On The Mechanical Characteristics Of Optical Fibers", International Wire & Cable Symposium Proceedings, (1990), pp. 715–721.

Cuomo, et al., "Behavior Of Optical Fibre Stripping Force Under Different Aging Test Conditions", EFOC Proceedings (1991), pp. 27–30.

Abel, et al., "Dynamic Water Sensitivity Of UV Acrylate Inks And Matrix Coating, and Its Relationship To The Water Soak Performance Of Optical Fibre Ribbons", EFOC & N, Fiber Optic Communications, (1993), pp. 298–302.

Moses, et al., "A Test For Optical Fiber Coating Strippability", International Wire & Cable Symposium Proceedings (1987), pp. 163–167.

Jackson, et al., "Fiber Protective Coating Design Parameters For Current Telecommunication Applications", $10^{th}$ NFOEC Proceedings, (1994), pp. 93–100.

Sommer, et al., One Dual Coating System For Fiber To Meet All Needs: Long Time Loop, And Ribbon Cable, $12^{th}$ EFOC & N Proceedings, (1994), pp. 155–157.

Aloisio, et al. "A Vasoelastic Analysis Of Thermally Induced Residual Stress in Duel Coated Optical Fibers", International Wire & Cable Symposium Proceedings (1995), pp. 139–145.

Petisce, et al., "Effect of novel cleaning solvents on Optical Fiber Coatings", International Wire & Cable Symposium Proceedings (1994), pp. 126–133.

Edwards, et al., "Ultraviolet–Cured Coatings For Optical Fibres—The Effect Of Coatings Design On Fibre Reliability", SPIE—The International Society For Optical Engineering Proceedings, Fiber Optics Reliability And Testing: Benign And Adverse Environments, vol. 2074, (1993), pp. 120–128.

Lawson, "Contributions And Effects Of Coatings On Optical Fibers", Proceedings—Optical Fibers In Adverse Environments, vol. 404, pp. 109–118.

Wei, "Degradation Of Fiber Strength During Coating Stripping", International Wire & Cable Symposium Proceedings (1989), pp. 199–204.

Szum, et al., "New Method For Measuring The Contribution Of UV Cured Coatings Toward Color Changes Upon Aging Of UV Cured Inks", International Conference on Plastics in Telecommunications (PIT VI), (1992), pp. P10/1–P10/8.

Nuyken, et al., "Oxetane Photopolymerization—A System With Low Volume Shrinkage", Macromol. Symp. 107, 125–138, (1996).

* cited by examiner

RADIATION-CURABLE OPTICAL FIBER PRIMARY COATING SYSTEM

This is a division of application Ser. No. 09/082,548, filed May 21, 1998.

FIELD OF THE INVENTION

The invention relates to radiation-curable, optical fiber coating systems comprising an inner and an outer primary coating compositions. The invention also relates to coated optical fibers and optical fiber assemblies. More particularly, the invention relates to a radiation- curable, optical fiber coating system that provides improved strip cleanliness and optical fibers coated with the coating system, ribbon assemblies comprising such coated optical fibers and methods of making and forming the same.

BACKGROUND OF THE INVENTION

Optical fiber coating systems commonly comprise two coating compositions. The first coating composition contacts the glass surface and is called the inner primary coating. The second coating composition is designed to overlay the inner primary coating and is called the outer primary coating.

The inner primary coating is usually a soft coating having a low glass transition temperature (hereinafter "Tg"), to provide resistance to microbending. Microbending can lead to attenuation of the signal transmission capability of the coated optical glass fiber and is therefore undesirable. The outer primary coating is typically a harder coating providing desired resistance to handling forces, such as those encountered when the coated fiber is cabled.

For the purpose of multi-channel transmission, optical fiber assemblies containing a plurality of coated optical fibers have been used. Examples of optical fiber assemblies include ribbon assemblies and cables. A typical optical fiber assembly is made of a plurality of coated optical fibers which are bonded together in a matrix material. For example, the matrix material can encase the optical fibers, or the matrix material can edge-bond the optical fibers together.

Optical fiber assemblies provide a modular design which simplifies the installation and maintenance of optical fibers by eliminating the need to handle individual optical fibers.

Coated optical fibers for use in optical fiber assemblies are usually coated with an outer colored layer, called an ink coating, or alternatively a colorant is added to the outer primary coating to facilitate identification of the individual coated optical glass fibers. Such ink coatings and colored outer primary coatings are well known in the art. Thus, the matrix material which binds the coated optical fibers together contacts the outer ink layer if present, or the colored outer primary coating.

When a single optical fiber of the assembly is to be fusion connected with another optical fiber, or with a connector, an end part of the matrix layer is required to be stripped away from the optical fiber. A common method for practicing ribbon stripping at a terminus of the ribbon assembly is to use a heated stripping tool. Such a tool consists of two plates provided with heating means for heating the plates to about 90 to about 120 C. An end section of the ribbon assembly is pinched between the two heated plates and the heat of the tool softens the matrix material and the primary coatings prior to and during the stripping procedure.

Ideally, the primary coatings on the coated optical fibers, and the ink coating if present, are removed simultaneously with the matrix material to provide bare portions on the surface of the optical fibers (hereinafter referred to as "ribbon stripping"). In ribbon stripping, the matrix material, primary coatings, and ink coating, are desirably removed as a cohesive unit to provide a clean, bare optical glass fiber which is substantially free of residue. Any residue can interfere with the optical glass fiber ribbon mass fusion splicing operation, and therefore is presently removed by wiping with a solvent prior to splicing. However, the solvent wipe can cause abrasion sites on the bare optical fiber, thus compromising the integrity of the connection. Many attempts have been made to increase the strip cleanliness of the ribbon assemblies by adding adhesion reducing additives to the inner primary coating which results in systems with little improvement in the strip cleanliness or system with insufficient adhesion. The ability to produce ribbon assemblies that can be stripped to provide clean, residue-free, bare optical glass fibers without unduly sacrificing other desirable or required properties of the primary coatings continues to challenge the industry.

There are many test methods which may be used to determine the performance of a ribbon assembly during ribbon stripping. An example of a suitable test method for determining the stripping performance of a ribbon is disclosed in the article by Mills, G., "Testing of 4- and 8-fiber ribbon strippability", 472 International Wire & Cable Symposium Proceedings (1992), the complete disclosure of which is incorporated herein by reference.

Many attempts have been made to understand the problems associated with ribbon stripping and to find a solution to increase ribbon stripping performance. The following publications attempt to explain and solve the problems associated with ribbon stripping: K. W. Jackson, et. al., "The Effect of Fiber Ribbon Component Materials on Mechanical and Environmental Performance", 28 International Wire & Symposium Proceedings (1993); H. C. Chandon, et. al., "Fiber Protective Design for Evolving Telecommunication Applications", International Wire & Symposium Proceedings (1992); J. R. Toler, et. al., "Factors Affecting Mechanical Stripping of Polymer Coatings From Optical Fibers", International Wire & Cable Symposium Proceedings (1989); and W. Griffioen, "Strippability of Optical Fibers", EFOC & N, Eleventh Annual Conference, Hague (1993).

The ability of a ribbon assembly to ribbon strip cleanly so as to provide bare optical glass fibers that are substantially free of residue was heretofore unpredictable and the factors affecting ribbon stripping not fully understood. Accordingly, there is a need for an optical fiber, radiation-curable coating composition system that improves the strippability of optical fiber ribbons.

SUMMARY OF THE INVENTION

It is an objective of the present invention to provide a radiation-curable, optical fiber primary coating system comprising an inner primary coating composition and a, colored or non-colored, outer primary coating composition that imparts improved ribbon stripping to a ribbon assembly, when incorporated therein.

It is another objective of the present invention to provide a coated optical fiber having a coating such that when it is incorporated into a ribbon assembly the ribbon assembly achieves better strip cleanliness.

It is another objective of the present invention to provide a ribbon assembly having improved ribbon stripping capabilities.

It is still a further objective of the present invention to provide a method of preparing a radiation-curable, optical fiber coating system comprising an inner primary coating composition and an outer primary coating composition that imparts improved ribbon stripping to a ribbon assembly, when incorporated therein.

Surprisingly, the above objects and other objects are and have been obtained by the following. The present invention provides a radiation-curable, optical fiber primary coating system having; i) a radiation-curable inner primary coating composition comprising at least strip enhancing component wherein said composition, after cure, is capable of sufficiently adhering to an optical fiber so as to prevent delamination in the presence of moisture and during handling, and ii) a radiation-curable outer primary coating composition that, upon cure, has a secant modulus of at least 1000 MPa (when measured on Mylar). Suitable strip enhancing components including, for example:

a. an oligomer comprising at least one strip agent moiety and/or a composite oligomer comprising at least one glass coupling moiety, at least one slip agent moiety, and at least one radiation-curable moiety capable of polymerizing under the influence of radiation;

b. a soluble wax that is soluble in said inner primary coating composition and/or a solid lubricant;

c. a radiation-curable silicone oligomer and/or a silicone compound which may be either non-radiation-curable or radiation-curable and/or mixtures thereof;

d. a silicone compound containing at least one radiation-curable functional group bound near a terminus of said compound;

e. a fluorinated component selected from the group consisting of a radiation-curable fluorinated oligomer, a radiation-curable fluorinated monomer, a non-radiation curable fluorinated compound or mixtures thereof;

f. a radiation-curable oligomer comprising at least one terminal linear moiety and/or at least one substantially linear radiation-curable oligomer;

g. a low-urethane oligomer wherein the calculated molecular weight concentration of said urethane groups in said oligomer is about 4% by weight or less, based on the total calculated molecular weight of the oligomer;

h. a radiation-curable oligomer having a polymeric backbone that has a molecular weight of at least about 2000, preferably more than 3100;

i. a radiation-curable oligomer and/or monomer diluent having a high aromatic content; and/or j. other slip enhancing additives and/or components discussed in applicants concurrently pending U.S. application Ser. No. 09/035,771, the entire disclosure of which is hereby incorporated by reference.

Also provided by the present invention is a coated optical fiber coated with a radiation-curable, optical fiber primary coating system discussed herein, a ribbon assembly comprising: a plurality of optical fibers, at least one optical fiber coated with a radiation-curable, optical fiber primary coating system discussed herein, and optionally an ink coating; and a matrix material bonding said plurality of coated optical fibers together; and processes for making such coated optical fibers and ribbon assemblies.

Other objects and advantages of the present invention will become more apparent to those persons having ordinary skill in the art to which the present invention pertains from the following description taken in conjunction with the accompanying drawings.

DETAILED DESCRIPTION OF PREFERRED EMBODIMENTS

The present invention is direct to radiation-curable, optical fiber primary coating systems (optical fibers coated with a primary coating system, and ribbon assemblies comprising such coated optical fibers) that provide improved ribbon stripping (ie., when incorporated into a ribbon assembly enable the cured coatings, matrix materials and optional inks coating materials to strip relatively cleanly from the optical fiber). The primary coating systems of the present invention combines a radiation-curable inner primary coating having a slip enhancing component with a relatively high secant modulus outer primary coating to achieve improved ribbon stripping. The present invention provides a radiation-curable, optical fiber coating system comprising a radiation-curable inner primary coating composition and a radiation-curable outer primary coating composition. The coating compositions according to the present invention include those formulated from (A) an oligomer (often referred to as a pre-polymer) system, (B) a monomer diluent system, (C) an optional photoinitiator system, and (D) additives. Background teachings on how to formulate and apply radiation-curable compositions for fiber optic materials can be found in, for example, U.S. Pat. Nos. 5,384,342; 5,456,984; 5,596, 669; 5,336,563; 5,093,386; 4,716,209; 4,624,994; 4,572, 610; and 4,472,019, which are hereby incorporated in their entirety by reference.

For this invention, "pre-mixture ingredients" means that when formulating a radiation-curable composition from its ingredients, some interaction or reaction of the ingredients is possible in some cases after mixing. However, pre-mixture ingredient refers to the identity of the ingredient before any such interaction or reaction of the ingredients might occur after mixing.

Also, for this invention, "(meth)acrylate" means acrylate, methacrylate, or a mixture thereof. For this invention, "pre-polymer" and "oligomer" have equivalent meaning.

(A) The Oligomer System

In this invention, the pre-polymer or oligomer system comprises one or more radiation-curable oligomers. In general, an oligomer system is first prepared, optionally in the presence of a monomer diluent. Then, the oligomer formulation is further formulated by mixing with other ingredients such as monomer diluents, photoinitiator, and additives. If multiple oligomers are desired, individual oligomers can be synthesized separately, and then mixed, or they can be synthesized together in a single, one-pot synthesis. In either case, the synthesis of oligomers often produces a statistical distribution of different types of oligomers which can be represented by idealized structures.

If some ingredients from the monomer diluent system (see below) are present during oligomer synthesis, they are not considered part of the pre-polymer system because, in general, monomer diluent does not react substantially during oligomer preparation and merely functions as a solvent for oligomer synthesis. In general, a monomer diluent can be distinguished from an oligomer because it will have a lower molecular weight than an oligomer, and will serve to decrease the viscosity of an oligomer. However, some monomer diluents can have repeating units such as repeating alkoxy units. However, for this invention, if the diluent functions to decrease the viscosity of the oligomer, then it is a called a diluent rather than an oligomer.

The amount of the oligomer system (A) can be, for example, about 10 wt. % to about 90 wt. %, and preferably, between about 20 wt. % to about 80 wt. %, and more preferably, about 30 wt. % to about 70 wt. %. Preferably, the oligomer amount is about 50 wt. %. If more than one oligomer is present, then the wt. % of each oligomer is added.

Radiation-curable oligomers can comprise one or more radiation-curable end groups and an oligomer backbone.

The end-group provides a cure mechanism, whereas the backbone provides suitable mechanical properties upon cure. In addition, the oligomer can comprise one or more linking groups such as a urethane- or urea-containing moiety which further can improve the mechanical performance of cured compositions. The linking groups can link an oligomeric backbone moiety to the radiation-curable end-group, or link oligomeric backbone moieties to themselves. Hence, for example, radiation-curable oligomers can be prepared from three basic components (backbone, linking, and radiation-curable components) and can be represented by structures such as, for example:

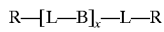

where R is a radiation-curable group, L is a linking group, and B is a backbone moiety. The variable x indicates the number of backbone moieties per oligomer molecule. This value X can be controlled by, for example, control of the reaction stoichiometry during oligomer synthesis. Typically, X is designed to be 1. In this representation, L and B are difunctional moieties, but oligomers can also be prepared from tri- and higher functional L and B moieties to provide branching. In the present invention, branching points in the oligomer are preferably present, and preferably result from use of at least some tri-functional groups L. Then, for example, an oligomer can also be represented by:

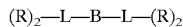

In particular, typical radiation-curable urethane acrylate oligomers according to the present invention are prepared from (i) at least one ingredient which reacts to provide the radiation-curable acrylate group R, (ii) at least one ingredient which reacts to provide the urethane linking group L, and (iii) at least one ingredient which reacts to provide the backbone B. Different urethane acrylate oligomer synthetic strategies are disclosed in, for example, U.S. Pat. No. 5,093,386, which is hereby incorporated by reference. Other synthetic methods, however, may be used to prepare equivalent structures. These methods may be adapted by methods known in the art to provide urea linkages, methacrylate linkages, and other common types of linkages found in radiation-curable oligomers.

The radiation-curable oligomer can cure by reaction of its radiation-curable groups, R, via a free-radical mechanism or by cationic mechanism. A free-radical cure, however, is preferred. Ethylenically unsaturated groups are preferred. Exemplary radiation-curable groups include (meth)acrylate, vinyl ether, vinyl, acrylamide, maleate, fumarate, and the like. The radiation-curable vinyl group can participate in thiol-ene or amine-ene cure. Most preferably, the radiation-curable group is an acrylate if fast cure speed is desired.

Preferably, the oligomer comprises at least two radiation-curable groups, and preferably, at least two ethylenically unsaturated groups. The oligomer, for example, can comprise two, three, or four radiation-curable groups which are all preferably ethylenically unsaturated groups. There is no strict upper limit on the number of radiation-curable groups per oligomer, but in general, the number of radiation-curable groups is less than 10, and preferably, less than 8.

The oligomer can comprise copolymeric structures including random and block copolymeric structures. Methods known in the art can be used to prepare such copolymeric structures. For example, backbone moieties can be copolymeric. Also, a one-pot synthesis of multiple oligomers can be executed with use of multiple backbone moieties. Using multiple backbone moieties can yield at least some block copolymeric oligomers in the pre-polymer system. Formulation design of copolymeric oligomers can result in a better balance of properties and provide synergistic effects, which usually is crucial for fiber optic materials. In addition, oligomer blends or mixtures can be used to balance properties and provide synergistic effects.

For processing reasons, it is important to control the oligomer system's viscosity and flow behavior. For practical reasons, oligomers should be easy to remove from the reactors and flasks in which they are synthesized. If viscosity is too high, it will be difficult to process the oligomer system during formulation, even with some monomer diluent present.

If an oligomeric polyether diol is used, the polyether may include, for example, substantially non-crystalline polyethers. The oligomer may include polyethers comprising repeating units of one or more of the following monomer units:

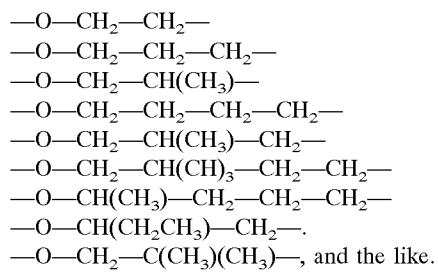
—O—CH$_2$—C(CH$_3$)(CH$_3$)—, and the like.

An example of a polyether polyol that can be used is the polymerization product of (i) tetrahydrofuran, or (ii) a mixture of 20 percent by weight of 3-methyltetrahydrofuran and 80 percent by weight of tetrahydrofuran, both of which have undergone a ring opening polymerization. This latter polyether copolymer contains both branched and non-branched oxyalkylene repeating units and is marketed as PTGL 1000 (Hodogaya Chemical Company of Japan). Another example of a polyether in this series which can be used is PTGL 2000 (Hodogaya Chemical Company). Butyleneoxy repeat units are preferred to impart flexibility to one oligomer in particular and the pre-polymer system in general.

If a polyolefin diol is used, the polyolefin is preferably a linear or branched hydrocarbon containing a plurality of hydroxyl end groups. Fully saturated, for example, hydrogenated hydrocarbons, are preferred because the long term stability of the cured coating increases as the degree of unsaturation decreases. Examples of hydrocarbon diols include, for example, hydroxyl-terminated, fully or partially hydrogenated 1,2-polybutadiene; 1,4- and 1,2-polybutadiene copolymers, 1,2-polybutadiene-ethylene or -propylene copolymers, polyisobutylene polyol; mixtures thereof, and the like.

Other suitable oligomers may include polyester oligomers, polycarbonates oligomers, mixtures of any of the aforementioned oligomer types and the like.

The linking group of the oligomer can be a urethane or urea group, and preferably is a urethane group. It is well-known in the art that urethane linkages can be formed by reaction of a polyfunctional isocyanate with a hydroxy compound including a hydroxy-containing backbone component or a hydroxy-containing radiation-curable component.

Polyfunctional isocyanates include diisocyanates, triisocyanates, and higher order polyisocyanates which can provide the linking group. As known in the art, isocyanate compounds can be trimerized to form isocyanurate compounds which can provide the linking group. Hence, polyisocyanate compounds can be oligomerized or polymerized to form higher order polyisocyanates comprising isocyanurate group. Isocyanurate compounds are a preferred example of how to provide a cyclic group having the capacity to hydrogen bond.

Generally, the compound providing a radiation-curable terminus to the oligomer contains a functional group which can polymerize under the influence of actinic radiation and a functional group which can react with the diisocyanate. Hydroxy functional ethylenically unsaturated monomers are preferred. More preferably, the hydroxy functional ethylenically unsaturated monomer contains acrylate, methacrylate, vinyl ether, maleate or fumarate functionality.

In the reaction between hydroxy group of the compound providing the terminus and isocyanate groups of compound providing the linking sites, it is preferred to employ a stoichiometric balance between hydroxy and isocyanate functionality and to maintain the reaction temperature of at least 25° C. The hydroxy functionality should be substantially consumed. The hydroxy functional ethylenically unsaturated monomer attaches to the isocyanate via a urethane linkage. Monomers having (meth)acrylate functional groups include, for example, hydroxy functional (meth) acrylates such as 2-hydroxyethyl acrylate, 2-hydroxypropyl acrylate, methacrylate analogs, and the like. Monomers having vinyl ether functional groups include, for example, 4-hydroxybutyl vinyl ether, and triethylene glycol monovinyl ether. Monomers having maleate functional groups include, for example, maleic acid and hydroxy functional maleates.

There is no particular limitation on the molecular weight of the oligomer, but the number average molecular weight of the oligomer in general can be less than about 25,000 g/mol, and preferably, less than about 10,000 g/mol, and more preferably, less than about 5,000 g/mol. Molecular weight is preferably greater than about 500 g/mol.

(B) The Monomer Diluent System

The compositions according to the invention also comprises a monomer, or reactive, diluent system which comprise at least one monomer diluent. The reactive diluent can be used to adjust the viscosity of the coating composition. Thus, the reactive diluent can be a low viscosity monomer containing at least one functional group capable of polymerization when exposed to actinic radiation.

The reactive diluent is preferably added in such an amount that the viscosity of the coating composition is in the range of about 1,000 to about 10,000 mPa.s.

Suitable amounts of the reactive diluent have been found to be about 10 wt % to about 90 wt %, and more preferably about 20 wt. % to about 80 wt. %, and more preferably, about 30 wt. % to about 70 wt. %.

A monomer diluent preferably has a molecular weight of not more than about 550 or a viscosity at room temperature of not more than about 300 mPa.s (measured as 100% diluent).

The radiation-curable functional group present on the reactive diluent may be of the same nature as that used in the radiation-curable oligomer. Preferably, the radiation-curable functional group present in the reactive diluent is capable of copolymerizing with the radiation-curable functional group present on the radiation-curable oligomer. Ethylenic unsaturation is preferred. In particular, acrylate unsaturation is preferred.

Preferably, the reactive diluent system comprises a monomer or monomers having an acrylate or vinyl ether functionality and an $C_4$–$C_{20}$ alkyl or polyether moiety. Examples of such reactive diluents include hexylacrylate, 2-ethylhexylacrylate, isobornylacrylate, decylacrylate, laurylacrylate, stearylacrylate, ethoxyethoxy-ethylacrylate, laurylvinylether, 2-ethylhexylvinyl ether, N-vinyl formamide, isodecyl acrylate, isooctyl acrylate, vinylcaprolactam, N-vinylpyrrolidone and the like.

Another type of reactive diluent is a compound comprising an aromatic group. Examples of diluents having an aromatic group include:

ethyleneglycolphenyletheracrylate,
polyethyleneglycolphenyletheracrylate,
polypropyleneglycolphenyletheracrylate, and
alkyl-substituted phenyl derivatives of the above monomers, such as polyethyleneglycolnonylphenyletheracrylate.

Furthermore, a reactive diluent can contain two groups capable of polymerization using actinic radiation. A diluent having three or more of such reactive groups can be present as well. Examples of such monomers include:

$C_2$–$C_{18}$ hydrocarbondioldiacrylates,
$C_4$–$C_{18}$ hydrocarbondivinylethers,
$C_3$–$C_{18}$ hydrocarbontrioltriacrylates,
the polyether analogs thereof, and
the like, such as
1,6-hexanedioldiacrylate,
trimethylolpropanetriacrylate,
hexanedioldivinylether,
triethyleneglycoldiacrylate,
pentaeritritoltriacrylate,
tripropyleneglycol diacrylate
alkoxylated bisphenol A diacrylate.

Preferably, the oligomer and the reactive diluent each contain an acrylate group as a radiation-curable group.

(C) The Optional Photoinitiator System

The composition may optionally further comprise at least one photoinitiator. Photoinitiator is required for a fast UV cure but may be omitted for electron beam cure. Conventional photoinitiators can be used. Examples include benzophenones, acetophenone derivatives, such as alpha-hydroxyalkylphenylketones, benzoin alkyl ethers and benzil ketals, monoacylphosphine oxides, and bisacylphosphine oxides. A preferred photoinitiator is 1-hydroxycyclohexylphenylketone (Irgacure 184, Ciba Geigy).

Often mixtures of photoinitiators provide a suitable balance of properties.

The amount of photoinitiator system is not particularly limited but will be effective to provide fast cure speed, reasonable cost, good surface and through cure, and lack of yellowing upon aging. Typical amounts can be, for example, about 0.3 wt. % to about 10 wt. %, and preferably, about 1 wt. % to about 5 wt. %.

(D) Additives

Conventional additives can be used in effective amounts. For example, additives such as stabilizers to prevent gellation, UV screening compounds, leveling agents, polymerization inhibitors, light stabilizers, chain transfer agents, colorants including pigments and dyes, plasticizers, fillers, wetting improvers, preservatives, and the like can be used. Other polymers and oligomers can be added to the compositions. Moisture content in the coatings is preferably minimized.

Preferred inner primary coating compositions of the primary coating system of the present invention comprise in place of or in addition to the above-noted components a sufficient amount of one or more slip enhancing components such that after cure the composition has in addition to:
i) a glass transition temperature below 0° C., preferably below –10° C., more preferably below –20° C.; and
ii) sufficient adhesion to said glass fiber to prevent delamination in the presence of moisture, preferably, an adhesion of at least 5 g/in when conditioned at 95% (RH);
a fiber friction value of less than 40 g/mm, preferably less than 30 g/mm, more preferably less than 20 g/mm, most preferably greater than 10 g/mm and a crack propagation of greater than 0.7 mm at 90° C., preferably greater than 1.0 mm, more preferably greater than 1.5 mm, and most preferably, greater than 2 mm at the desired/design ribbon stripping temperature, of for instance 90° C.

Preferred outer primary coating compositions of the primary coating system of the present invention which may be colored or non-colored include compositions generally formulated from components as set forth herein that have, after cure, a secant modulus of greater than 1000 MPa, preferably greater than 1050 MPa, and more preferably greater than 1100 MPa at 23° C. and a glass transition temperature of above 40° C., preferably above 50° C.

(E) Slip Enhancing Component

1) Composite Oligomer

A suitable slip enhancing component of the present invention includes a composite oligomer that can be used to adjust the fiber friction between the inner primary coating and the surface of the optical glass fiber. The composite oligomer comprises at least one glass coupling moiety, at least one slip agent moiety, and/or at least one radiation-curable moiety. Preferably, the composite oligomer will comprise at least two different types of these moieties, for example, at least one a slip agent moiety and at least one radiation-curable moiety, more preferably the composite oligomer will comprise at least one of each of these three types of moieties. Preferably, the various moieties of the composite oligomer are covalently bonded together. Linkage of these moieties can be direct so that there are no intermediate linking groups between the oligomer and the moiety. Alternatively, however, the linkage can be indirect by using intermediate linking groups.

A variety of glass coupling, slip agent, and radiation-curable moieties are known in the art. The present invention can be practiced with use of various embodiments using different combinations of these moieties to produce a composite oligomer. A person skilled in the art will easily be able to prepare combinations of these various moieties from the present disclosure and general knowledge in the art.

Radiation-curing can occur by reaction of the composite oligomer's radiation-curable moieties with themselves and/or with radiation-curable moieties bound to other components of a formulation. In general, curing of the composite oligomer occurs in concert with other radiation-curable components. The inner primary compositions comprising a composite oligomer are preferably directed to reactions wherein the radiation-curable moiety reacts not with the glass coupling or slip agent moieties. For example, although the glass coupling moiety will be reactive, and is often sensitive to hydrolysis and condensation reactions, these types of reactions are not the preferred cure mechanism.

The molecular weight of the composite oligomer is not limited. In general, however, the molecular weight of the composite oligomer in its uncured state is usually between about 200 and about 10,000, preferably between about 500 and about 5,000.

There is no particular limitation on the molecular architecture of the composite oligomer, although linear or substantially linear oligomeric structures are preferred over other useful non-linear, cyclic, or branched structures. A substantially linear structure means that there is a single, dominant linear oligomeric backbone which is "capped" at the two ends of the backbone. The amount of branching units in the backbone is generally less than about 10 mole %, and preferably, less than about 5 mole %. The linear backbone may contain one or more types of repeat units, although preferably, one major type of repeat unit is used. Nevertheless, block or random copolymeric structures can be used if necessary. With a substantially linear backbone, the number of branch points in the backbone will be kept to a minimum, and preferably, will not be used. Synthetic simplicity in the oligomer structure is preferred to the extent that cost-performance can be achieved.

The term "glass coupling moiety" is understood to mean a functional group which is known or has the ability to improve adhesion to an inorganic surface and in particular, a glass surface. Preferably, the glass coupling moiety includes groups that are known to covalently bond with an inorganic material, particularly as a result of a hydrolysis and/or condensation reaction. Suitable glass coupling moieties may include those derived from conventional coupling agents including conventional silane coupling agents disclosed in E. P. Plueddemann's *Silane Coupling Agents*, Plenum Press (1982), the complete disclosure of which is hereby incorporated by reference; non-silane coupling agents, for example, chromium, orthosilicate, inorganic ester, titanium, and zirconium systems. Although the present invention is preferably practiced with use of silane glass coupling moieties, the invention is not so restricted, and a person skilled in the art is enabled by the present disclosure to use these other systems as well.

In the present invention, the glass coupling moieties may be derived from these conventional coupling agents which are covalently incorporated into the composite oligomer in a manner which preserves their coupling function to the inorganic surface. In a preferred embodiment, for example, the organic component of a conventional coupling agent is linked covalently, either directly or indirectly, with the composite oligomer which additionally comprises slip agent and radiation-curable moieties. After this linkage, the glass coupling moiety will still have its inorganic component effective for bonding with the inorganic surface or at the inorganic-organic interface. However, the invention is not so limited, and the glass coupling moiety is not necessarily linked to the composite oligomer by reaction of the organic functional group of a conventional coupling agent.

Silane coupling moieties are preferred. Silane coupling moieties having at least one hydrolyzable "—Si—O—R" linkage are particularly preferred. Even more preferred are silane coupling moieties represented by the following formula:

where R represents a $C_1$–$C_4$ alkyl group, preferably methyl or ethyl, which imparts at least some hydrolyzability to the silane.

Common organic functionalities of the silane coupling agents include, for example, amino, epoxy, vinyl, (meth) acryloxy, isocyanato, mercapto, polysulfide, and ureido. Using synthetic methods known in the art, the organic functionality can be reacted with the oligomer to yield a covalent linkage between the glass coupling moiety and the oligomer. In a preferred embodiment, for example, mercaptopropyl silane is linked with an oligomer containing an isocyanate group to form a thiourethane adduct between the mercapto group and the isocyanate group. Although a strong linkage is preferred, the present invention encompasses the possibility that although a covalent linkage is formed, the covalent linkage may not be strong and may, for example, be sensitive to disruption with the application of heat. However, as long as the glass coupling moiety produces the desirable effect of promoting adhesion, the covalent linkage is sufficient. If necessary, catalysts may be used to promote linkage formation.

Slip agent moiety of the composite oligomer do not substantially affect the adhesion of the inner primary coating to the surface of the optical glass fiber. Instead, the slip agent moiety is intended to reduce the sliding force of the inner primary coating against the surface of the optical glass fiber, once the bonds between the surface of the optical glass fiber and inner primary coating are broken (i.e. after the inner primary coating has been delaminated).

Slip agents are known in the art as, among other things, release, antiblocking, antistick, and parting agents. Slip agents are commonly oligomeric or polymeric and are usually hydrophobic in nature, with the most common examples including silicones (or polysiloxanes), fluoropolymers, and polyolefins. The slip agent moiety of the present invention may be derived from such conventional slip agents and may include, for example, silicones, fluoropolymers, and/or polyolefins in combination with polyesters, polyethers and polycarbonates. Additional suitable slip agents are disclosed in, for example, the article entitled "Release Agents" published in the *Encyclopedia of Polymer Science,* 2nd Ed., Vol. 14, Wiley-Interscience, 1988, pgs. 411–421, the complete disclosure of which is hereby incorporated by reference. Although slip agents operate over a wide variety of interfaces, the present invention is particularly concerned with an interface of a glass surface, and in particular, the inorganic-organic coating interface between the inner primary coating and the surface of the optical glass fiber. A typical slip agent moiety of the composite oligomer is derived from one of the aforementioned slip agents that is covalently incorporated into the composite oligomer.

In a preferred embodiment, the slip agent moiety is the principal component of the oligomer in terms of weight percent because the slip agent moiety itself is usually oligomeric in nature, and the glass coupling and radiation-curable moieties are usually of lower molecular weight. For example, the slip moiety can be up to about 95 wt. %, relative to the total weight of the composite oligomer, when the three moieties are directly linked together. However, when an oligomeric backbone is present, the slip agent usually can be up to about 85 wt. %, relative to the total weight of the composite oligomer. As with the molecular weight of the composite oligomer of the present invention, the molecular weight of the slip agent moiety is not strictly limited, but will generally be between about 150 and about 9,500, preferably, between about 400 and about 4500.

As with the molecular architecture of the oligomer, there is no particular limitation on the molecular architecture of the slip agent moiety, although in general, substantially linear structures can be used. Non-linear or branched structures, however, are not excluded. Oligomeric slip agent moieties, when present, may contain different kinds of repeat units, although preferably, there is one main type of repeat unit.

Oligomeric silicone slip agent moieties are preferred, and oligomeric silicones comprising substantial portions of methyl side groups are particularly preferred. The side groups preferably impart hydrophobic character to the silicone. Other preferred side groups include ethyl, propyl, phenyl, ethoxy, or propoxy. In particular, dimethylsiloxane repeat units represented by the formula, "—OSi(CH$_3$)$_2$—" are preferred.

In a preferred embodiment, the end groups on a substantially linear silicone oligomer can be linked with a radiation-curable moiety at one end and a slip agent moiety at the other end. Such linkage can involve intermediate linkage groups. Although linkage at the silicone oligomer end group is preferred, the silicone moiety can be tailored for linkage with slip agent and radiation-curable moieties at other points in the oligomer molecule besides the end groups. For example, functional groups can be incorporated throughout the molecular structure of the silicone oligomer that are linked with the radiation-curable and slip agent moieties. Examples of functionalized silicones which can be incorporated into the oligomer include polyether, polyester, urethane, amino, and hydroxyl.

Other suitable types of slip agent moieties include those derived from fluorinated slip agents. Examples of such fluorinated slip agents include FC-430, FX-13, and FX-189 (Minnesota Mining and Manufacturing), Fluorolink E (Ausimont), and EM-6 (Elf Atochem).

Generally, the composite oligomer of the present invention is surface active because of the glass coupling moieties, and in particular, may tend to concentrate at coating interfaces, such as the inorganic-organic interface, if not bound in the inner primary coating. However, the covalent binding of the composite oligomer after cure, due to the radiation-curable moiety, may retard such surface activity or migration. Surface activity means that the composite oligomer, when placed in a formulation, tends to migrate to the surface of the formulation rather than be dispersed evenly throughout the formulation.

The radiation-curable moiety should help ensure that the composite oligomer is covalently linked within a radiation-curable coating so that the composite oligomer cannot be extracted or volatilized from the cured coating without breaking covalent bonds.

The radiation-curable moiety can include any functional group capable of polymerizing under the influence of, for example, ultraviolet or electron-beam radiation. One type of radiation-curable functionality is, for example, an ethylenic unsaturation, which in general is polymerized through radical polymerization, but can also be polymerized through cationic polymerization. Examples of suitable ethylenic unsaturation are groups containing acrylate, methacrylate, styrene, vinylether, vinyl ester, N-substituted acrylamide, N-vinyl amide, maleate esters and fumarate esters. Preferably, the ethylenic unsaturation is provided by a group containing acrylate, methacrylate or styrene functionality. Most preferably, the ethylenic unsaturation is provided by a group containing acrylate functionality.

Another type of functionality generally used is provided by, for example, epoxy groups, or thiol-ene or amine-ene systems. Epoxy groups, in general, can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The amount or number of glass coupling, slip agent, and radiation curable moieties in the composite oligomer is not particularly limited provided that advantages of the present invention can be achieved and the inventive concept is practiced. Thus, a single molecule of the composite oligomer can contain multiple numbers of glass coupling, slip agent, or radiation-curable moieties, although in a preferred embodiment, a single oligomeric molecule contains one glass coupling, one slip agent, and one radiation-curable moiety.

The glass coupling, slip agent, and radiation curable moieties should be covalently linked together in the oligomer. There is no particular limitation to how this linkage is effected provided that advantages of the present invention are achieved and the inventive concept practiced. Linkage may entail direct linkage to the oligomer, or alternatively, indirect linkage to the oligomer. Intermediate linking groups will generally operate by way of two functional groups on a linking compound which can link, for example, the radiation-curable moiety with the slip agent moiety, or link the glass coupling moiety with the slip agent moiety.

Representative linking compounds include diisocyanate compounds, wherein linkage occurs by formation of urethane, thiourethane, or urea links by reaction of hydroxyl, thiol, and amino groups respectively, with isocyanate. Such diisocyanate compounds are well-known in the polyurethane and radiation-curable coating arts. Aromatic or aliphatic diisocyanates can be used, although aliphatic diisocyanates are preferred. Other linkages can be through, for example, carbonate, ether and ester groups. Preferably, urethane, urea or thiourethane groups are used as the linking groups.

The oligomer, therefore, preferably comprises within its structure at least one linkage represented by

—NH—CO—X— wherein X is an oxygen, sulfur, or nitrogen atom. Urethane and thiourethane groups are most preferred. Urethane groups, for example, can hydrogen bond.

Although the present invention is not limited to one particular molecular architecture for the composite oligomer, in a preferred embodiment which makes use of intermediate linking groups, the composite oligomer can be represented by the following generic structure:

R—L$_1$—A—L$_2$—C wherein
A represents the slip agent moiety,
R represents a radiation-curable moiety,
C represents the glass coupling moiety, and
L$_1$ and L$_2$ represent linking groups.
L$_1$ and L$_2$ can be independently any group capable of providing a covalent link between the "R" moiety and the "A" moiety or between the "C" moiety and the "A" moiety. Based on the disclosure provided herein, one skilled in the art will easily be able to understand what linking groups are suitable for the particular "A", "C" and "R" groups selected.

In particular, urethane and thiourethane groups are preferred. Urethane and thiourethane linking groups are formed by, for example, (i) linking a hydroxyl end-capped oligomer with a low molecular weight diisocyanate compound at both oligomer ends without extensive coupling of the oligomer, (ii) linking the isocyanate end-capped oligomer with a low molecular weight hydroxyacrylate compound, or (iii) linking the isocyanate end-capped oligomer with a low molecular weight mercapto compound.

The linking groups, however, are considered optional. In other words, the oligomer also can be represented by the following generic structures:

R—L$_1$—A—C,

R—A—L$_2$—C, or

R—A—C.

Although the present invention is disclosed in terms of the aforementioned groups or moieties, other groups can in principle be incorporated into the molecular structure to the extent that the advantages of the present invention can be achieved and the inventive concept practiced.

A preferred embodiment of the present invention is the preparation of a composite oligomer with use of the following ingredients: a silicone oligomer having two hydroxyl end groups (slip agent moiety), isophorone diisocyanate (linkage), hydroxyethyl acrylate (radiation-curable moiety), and mercaptopropyl silane (glass coupling moiety). isophorone diisocyanate (IPDI) serves to end-cap both ends of the silicone diol oligomer and provide a linking site with the hydroxyethyl acrylate at one end of the silicone oligomer and with the mercaptopropyl silane at the other end.

A preferred application for the composite oligomer is as an oligomeric additive, or even as a main oligomeric component, in a radiation-curable coating, and in particular, an inner primary, optical glass fiber coating. The amount of oligomeric additive incorporated into the radiation curable matrix is not particularly limited but will be sufficient or effective to achieve the specific performance objectives of the particular application. In general, however, a suitable amount will be between about 0.5 wt. % and about 90 wt. %, preferably, between about 0.5 wt. % and about 60 wt. %, and more preferably, between about 0.5 wt. % and about 30 wt. % with respect to the total weight of the radiation-curable coating formulation. In general, higher molecular weight composite oligomers will be present in a radiation-curable coating in greater weight percentages than lower molecular weight composite oligomers.

The composite oligomer functions to tailor the properties of formulations which exhibit too great a coefficient of friction or too low adhesion. Specifically, the composite oligomer can increase the adhesion if the adhesion is unacceptably low, and in particular unacceptably low in the presence of moisture. Alternatively, the composite oligomer can reduce the coefficient of friction of a coating. Conventional coupling additives and slip agents cannot perform this dual function.

If desired, although a reduction in the number of additives is desirable, the composite oligomer can be used in conjunction with other coupling and slip agents to improve absolute performance or cost-performance. In a preferred embodiment, for example, the composite oligomer can be used in conjunction with a functional organosilane compound such as, for example, mercaptopropyl silane. For example, a hydroxybutylvinylether adduct with OCN—(CH$_2$)$_3$Si(OCH$_3$)$_3$ can also be used together with the composite oligomer.

The composite oligomer can be incorporated into a wide variety of radiation-curable formulations. There are no particular limitations provided that the inventive concept is practiced and advantages accrue. One skilled in the art of formulating radiation-curable coatings will easily be able to incorporate the composite oligomer therein to provide the desired properties.

In optical glass fiber coating applications, for example, other formulation components generally include:

(i) at least one multi-functional radiation-curable oligomer, which is a different oligomer than the composite oligomer of the present invention, to provide a cross-linked coating;
(ii) at least one reactive diluent to adjust the viscosity to a level acceptable for application to optical glass fibers, and
(iii) at least one photoinitiator.

Additives such as antioxidants, and as already noted, coupling and slip agents may also be utilized.

Radiation-curing is generally rapidly effected with use of ultraviolet light, although the present invention is not so limited, and a person of skill in the art can determine the best cure method. Radiation-curing results in polymerization of at least some of the radiation-curable moieties present in the composite oligomer which covalently links the composite oligomer to itself or, more preferably, other radiation-curable components in the formulation. The chemical processes which occur upon mixing and curing formulations are in some cases complex and may not be fully understood. The present invention, however, is not limited by theory and can be readily understood and practiced by persons of skill in the art. The formulations of the present invention, just like the composite oligomer, can be in pre-cured, partially cured, and in cured states.

The composite oligomer can be incorporated into inner primary coating compositions, outer primary coating compositions, ink compositions and matrix forming compositions. The composite oligomer also can be incorporated into so-called single coating systems.

In general, the coating substrate, which includes optical fiber, will be an inorganic or glass substrate, although in principle, other substrates such as polymeric substrates may also be effectively used. The glass coupling moiety of the oligomeric additive preferably has the capacity to couple the substrate. In a preferred application, the coating substrate is an optical glass fiber, and in particular, a freshly drawn, pristine optical glass fiber. Freshly prepared optical glass fiber is known in the art to be responsive to glass coupling agents. Exemplary methods of coating optical fibers are disclosed in, for example, U.S. Pat. Nos. 4,474,830 and 4,913,859, the complete disclosures of which are hereby incorporated by reference.

The present inventions will be further explained by use of the following non-limiting examples.

EXAMPLE 1-1 AND COMPARATIVE EXAMPLES 1-A and 1-B

Synthesis of a Composite Oligomer

A 1,000 mL four-necked flask was charged with isophorone diisocyanate (55.58 g). 2,6-di-tertbutyl-4-methylphenol (0.12 g) and dibutyltin dilaurate (0.24 g) were added to the flask. 14.51 grams of hydroxyethyl acrylate was added over a 90 minute period while maintaining the temperature below 40 C. At the end of 90 minutes, the temperature was increased to 40 C, and the mixture was stirred at 40 C for one hour. The temperature was allowed to decrease to about 30 C. Mercaptopropyl silane (28.13 g of an 87.1% pure product) was added over 90 minutes during which time the temperature was maintained below 40 C. After the addition of mercaptopropyl silane, the temperature was increased to 40 C, and the reaction mixture was stirred at 40 C for 17–18 hours. 300 g of a 50% ethoxylated polydimethylsiloxane diol of 1200 equivalent weight Q4-3667 (Dow Corning) was then added, and the temperature was increased to 70 C. After about six hours, the isocyanate content was measured to be about zero percent. The temperature was decreased to 50 C. Based on the reaction conditions and reactants, a composite silicone silane acrylate oligomer was formed having the following structure:

H-I-(Q4-3667)-I-M wherein:
H=hydroxyethylacrylate,
I=isophorone diisocyanate,
Q4-3667=the above described silicone diol, and
M=mercaptopropyl silane

Preparation of Radiation-Curable, Optical Fiber Inner Primary Coating Compositions The components shown in Table 1A were combined, except for the composite oligomer and the silane coupling agent. The components were heated to about 60° C. and mixed to form homogeneous mixtures. The composite oligomer and silicone coupling agent were mixed therein and the mixture was heated for approximately 15 minutes at 60° C. to form an improved radiation-curable, inner primary, optical glass fiber coating composition, Example 1-1. The mixtures for Comparative Examples 1-A and 1-B were prepared similarly. Drawdowns of the compositions were made and then suitably cured by exposure to UV light to form cured coatings. The cured coatings were tested for resistance to delamination and fiber pull-out residue and the results are presented in Table 1A.

TABLE 1A

| Component (wt. %) | Ex. 1-1 | Comp. Ex. 1-A | Comp. Ex. 1-B |
|---|---|---|---|
| Urethane acrylate oligomer | 53.2 | 56 | 53.87 |
| Isodecyl Acrylate | 13.3 | 14 | 13.47 |
| Ethoxylated-nonylphenol Monoacrylate | 24.22 | 25.5 | 24.53 |
| Composite Oligomer H-I-Q4-3667-I-A189 | 5 | 0 | 0 |
| Q4-3667 (Dow Corning) | 0 | 0 | 3.8 |
| Photoinitiator | 2.85 | 3 | 2.89 |
| Antioxidant | 0.47 | 0.5 | 0.48 |
| γ-Mercapto-propyl Trimethoxy-Silane | 0.95 | 1.0 | 0.96 |
| Fiber Pull-out Residue Test | no residue | lots of residue | no residue |
| 60° C. Water Soak Delamination Test* | none | none | After 1 hour, delamination |

Table Notes:
*Samples were aged for 4 hours at 60° C. Then the water bath was shut-off for about 70 hours. The temperature was then brought back to 60° C. for an additional 48 hours.

Comparative Example 1-A was a formulation which did not contain the composite oligomer of the present invention, but which contained a silane coupling agent. However, poor results were obtained in the pull-out test because adhesion was too strong. Comparative Example 1-B was a formulation which contained a conventional silicone slip agent. The silicone slip agent improved the results of the pull-out test compared to Comparative Example 1-A, but only at the expense of hydrolytic interfacial adhesion. Example 1-1 was a formulation that contained the composite oligomer of the present invention. The composite oligomer remarkably improved the results of the pull-out test but not at the expense of hydrolytic interfacial adhesion.

EXAMPLES 1-2 & 1-3 AND COMPARATIVE EXAMPLES 1-C & 1-D

These Examples and Comparative Examples were conducted to demonstrate the effect of the composite oligomer on glass plate adhesion. The formulations shown in Table 1B were prepared in the same manner as in Example 1-1 and Comparative Examples 1-A and 1-B. The silicone silane acrylate oligomer was prepared in the same manner as in Example 1-1, except that a silicone diol HSi-2111 (Tego Chemie) was used instead of Q4-3667 (Dow Corning).

present in the inner primary composition, ii) the respective types of functional groups present in the wax and the monomers and oligomers present in the inner primary composition, and iii) the similarity between the molecular structure of the wax and the oligomers or monomers present

TABLE 1B

| Component (wt. %) | Ex. 1-2 | Ex. 1-3 | Comp. Ex. 1-C | Comp. Ex. 1-D |
|---|---|---|---|---|
| Oligomer C H-I-(PTHF2000-I)$_2$-H | 49.22 | 49.22 | 49.22 | 49.22 |
| Ethoxylated nonylphenol Acrylate | 24.76 | 24.76 | 24.76 | 24.76 |
| Lauryl Acrylate | 16.64 | 16.64 | 16.64 | 16.64 |
| 2,4,6-trimethylbenzoyl Diphenyl Phosphine Oxide | 3.0 | 3.0 | 3.0 | 3.0 |
| Thiodiethylene bis(3,5-di-Tert-Butyl-4-Hydroxy)hydrocinnamate | 0.46 | 0.46 | 0.46 | 0.46 |
| gamma-Mercaptopropyl Trimethoxy Silane | 0.92 | — | 0.92 | — |
| Composite Oligomer H-I-HSi2111-I-M | 5 | 5 | — | — |
| Adhesion at 50% RH (g/in) | 45 | 14 | 27 | 9 |
| Adhesion at 95% RH (g/in) | 34 | 12 | 20 | 4 |
| 60° C. Water Soak Delamination Test* | After 24 hours, no delamination | After 15 minutes, slight delamination | After 8 hours, no delamination; After 24 hours slight delamination | After 15 minutes, Delamination |

Table Notes:
*Samples were aged for 4 hours at 60° C. Then the water bath was shut-off for about 70 hours. The temperature was then brought back to 60° C. for an additional 48 hours.
The oligomers were formed by reacting the following monomers:
H = Hydroxyethyl Acrylate;
I = Isophorone Diisocyanate;
M = Mercapto Silane;
PTHF2000 = 2000 molecular weight Polytetramethylene Ether Glycol (BASF);

The results in Table 1B indicate that the composite oligomer is not only able to improve adhesion to the glass surface, but is also able to act synergistically with a conventional silane coupling agent.

2) Soluble Wax

Wax can be added as a slip enhancing component to lower the fiber friction between the inner primary coating and the surface of the optical fiber but not to the extent that it lowers the adhesion to an unacceptable level. Although numerous waxes are known, many waxes do not dissolve well in inner primary coatings and therefore they tend to separate out from solution. Furthermore, conventional waxes tend to cause the resulting inner primary coating to be hazy in appearance, which is undesirable. The term "soluble wax" is used herein to designate those waxes which are sufficiently soluble in the inner primary coating composition at the concentration required to provide the desired level of fiber friction. The term "wax" is understood to include waxes as defined in Hawley's "Condensed Chemical Dictionary", 11th edition, the said definition being incorporated herein by reference.

It has been found that by selecting modified waxes or by modifying the waxes, the incompatibility problems can be substantially avoided. In selecting a modified wax, the solubility of the modified wax in the desired inner primary composition should first be considered. Usually, waxes tend to be insoluble in inner primary coating compositions. The solubility of the wax in the inner primary coating will depend mainly upon the following: i) the relative polarity of the wax and the polarity of the monomers and oligomers in the inner primary composition, such as aliphatic/aromatic, unsaturated/saturated, linear/branched, etc., entities.

For example, the solubility of the wax can be increased by incorporating functional groups which are similar to those present in the oligomers or monomers present in the inner primary composition. If the inner primary composition contains monomers or oligomers having ester groups, then ester groups can be incorporated into the molecular backbone structure of the wax or the ester groups can be grafted onto the backbone of the wax. Alternatively, wax-like, long-chain fatty esters can be used. Commercial examples of suitable fatty esters include:

Laneto-50 and 100 (PEG-75 lanolin),
Laneto-AWS (PPG-12-PEG-50 lanolin),
Ritacetyl (acetylated lanolin),
Ritahydrox (hydroxylated lanolin),
Ritasol (isopropyl lanolate),
Ritalan (lanolin oil),
Ritalan AWS (PPG-12-PEG-65-lanolin oil),
Ritawax (lanolin alcohol),
Supersat (hydrogenated lanolin),
Forlan C-24 (choleth-24 and Ceteth-24),
Ritachol 1000 (cetearyl alcohol, polysorbate 60, PEG-150-stearate, and steareth-20),
Ritapro 100 (cetearyl alcohol, steareth-20, and steareth-10),
Pationic ISL (sodium isostearoyl lactylate),
Pationic CSL (calcium stearoyl lactylate),
Pationic SSL (sodium stearoyl lactylate),
Pationic SBL (sodium behenoyl lactylate),
Pationic 138C (sodium lauroyl lactylate), Pationic 122A (sodium caproyl lactylate),
Pationic SCL (sodium cocoyl lactylate),
Ritox 36 (laureth-23),
Ritox 52 (PEG-40 stearate),
Rita CA (cetyl alcohol),
Rita SA (stearyl alcohol), and
Rita Cetearyl Alcohol 70/30, (RITA Corp.). Preferably, the fatty ester modified wax is isocetyl stearate.

If the inner primary composition contains monomers or oligomers having alkoxy or hydroxy groups, then to increase the solubility of the wax, alkoxy or hydroxy groups, including for example ethoxy and propoxy groups, can be incorporated into the molecular backbone structure of the wax or the alkoxy groups can be grafted onto the backbone of the wax. Commercial examples of such modified waxes include the Unilin™ series of alcohol modified waxes from Petrolite, and Ritawax (lanolin alcohol),
Ritachol 1000 (cetearyl alcohol, polysorbate 60, PEG-150-stearate, and steareth-20),
Ritapro 100 (cetearyl alcohol, steareth-20, and steareth-10),
Rita CA (cetyl alcohol),
Rita SA (stearyl alcohol), and
Rita Cetearyl Alcohol 70/30, (RITA Corp.). Preferably, the alkoxy modified wax is polypropyleneglycol$_{12}$polyethyleneglycolsolanolin.

As another example, if the inner primary composition contains monomers or oligomers having amine groups, then to increase the solubility of the wax, amine groups can be incorporated into the molecular backbone structure of the wax or the amine groups can be grafted onto the backbone of the wax. An example of such a modified wax is the Aimeen™ series of amine modified waxes (Armak), such as
Armeen TD (tallowamine),
Armeen O, OL or OD (oleylamines),
Armeen SD (soyaamine),
Armeen 18 (octadecylamine),
Armeen HT, HTD or 2HT (hydrogenated tallow),
Armeen T or TM-97 (tallowamine),
Armeen 12D (dodecylamine),
Armeen C or CD (cocoamine),
Armeen 16D (hexadecylamine),
Armeen 2C (dicocoamine),
Armeen M2C (methyldicocoamine),
Armeen DM12D (dimethyldodecylamine),
Armeen DMCD or DMMCD (dimethylcocoamine),
Armeen DM14D (dimethyltetradecylamine),
Armeen DM16D (dimehylhexadecylamine),
Armeen DM18D (dimethyloctadecylamine),
Armeen DMHTD (dimethyl(hydrogenatedtallow)amine,
Armeen DMTD (dimethyltallow amine),
Armeen DMSD (dimethylsoyamine) or
Armeen DMOD (dimethyltallow amine). Preferably, the amine substituted wax is methyl di(hydrogenated tallow) amine.

An example of a further functional group that can be incorporated into the wax includes carboxylic acids. Suitable examples of saturated modified waxes include capric acid, lauric acid, myristic acid, palmitic acid, and stearic acid. Examples of suitable unsaturated modified waxes include oleic acid, ricinoleic acid, linoleic acid, and linolenic acid.

The functional groups present on the modified wax do not necessarily have to be identical with those present in the oligomers or monomers of the inner primary coating composition in order to achieve increased solubility. Functional groups having similar properties, such as hydrogen bonding, polarity, etc., can be mixed and matched as desired to increase solubility.

The solubility of the wax can also be increased by modifying a wax or selecting a wax having a similar molecular structure to that of the monomers and oligomers present in the inner primary composition. For example, if the monomers and oligomers contain aromatic groups, the wax can be selected or modified to contain aromatic groups. If the monomers or oligomers contain substantial amounts of unsaturation, then the wax can be modified or selected to contain substantial amounts of unsaturation. Furthermore, if the monomers or oligomers are substantially linear, then a substantially linear wax can be utilized. Commercial examples of substantially linear waxes include Polymekon, Ceramer 67 and 1608, and Petrolite C-400, CA-11, WB-5, WB-11, and WB-17 (Petrolite).

Based on the teachings provided herein, one skilled in the art will be able to modify or select the desired wax, and to use the selected wax in an amount to provide the desired level of fiber friction between the inner primary coating and the surface of the optical glass fiber. The amount of the wax present in the inner primary composition will depend on (1) the ability of the wax to impart the desired reduction in the fiber friction between the inner primary coating and the surface of the optical glass fiber, and (2) the solubility of the wax in the inner primary composition. The greater the solubility of the wax in the inner primary composition, the greater the amount of wax that can be present. The greater the ability of the wax to reduce fiber friction, the less wax that will be required. The amount of wax present should be about the minimum amount necessary to provide the desired level of fiber friction.

It has been found that suitable amounts of modified wax include from about 0.01% to about 10% by weight of the total inner primary composition, more preferably about 0.01% to about 5%, and most preferably about 0.01% to about 2%.

If desired, the wax can be further modified to include a radiation-curable functional group that can copolymerize with radiation-curable monomers and oligomers present in the inner primary composition. An example of such a radiation-curable functional wax is stearyl acrylate. The radiation-curable functional group in general does not have to be an acrylate group, but can be any known radiation-curable functional group, including those described herein.

The invention will be further explained by the following non-limiting examples illustrating the use of waxes.

EXAMPLES 2-1 THROUGH 2-4

The components shown in Table 2 were combined to form four inner primary coating compositions. Drawdowns of the inner primary coating compositions were made and then cured by exposure to UV light from a Fusion D lamp, under a nitrogen atmosphere. The crack propagation and fiber friction for each of the films were tested in the same manner as above. The results are shown in Table 2.

TABLE 2

| COMPONENT (wt. %) | Ex. 2-1 | Ex. 2-2 | Ex. 2-3 | Ex. 2-4 |
|---|---|---|---|---|
| Linear Urethane Acrylate Oligomer Having a Weight Average Molecular Weight of 5000, | 23 | — | — | — |
| Urethane Acrylate Oligomer H-I-PTGL2000-I-PTGL2000-I-H | — | 51.9 | 42.3 | 42.3 |
| Lauryl Acrylate | — | 16 | — | — |
| Ethoxylated Nonylphenol Acrylate | 64.4 | 25.6 | 46.2 | 46.2 |

TABLE 2-continued

| COMPONENT (wt. %) | Ex. 2-1 | Ex. 2-2 | Ex. 2-3 | Ex. 2-4 |
|---|---|---|---|---|
| Glyceryl Propoxy Triacrylate | 8 | — | — | — |
| Phenoxyethyl Acrylate | — | — | 5 | 5 |
| 2,4,6,-Trimethyl PhenylbenzoylDiphenyl Phosphine Oxide | 3 | 3 | 3 | 3 |
| Thiodiethylene bis(3,5-di-tert-butyl-4-hydroxy)hydrocinnamate | .5 | 0.5 | 0.5 | 0.5 |
| Polyethylene/maleic anhydride copolymer wax (Ceramer 1608) | .1 | — | — | — |
| Methyl di(hydrogenated tallow) Amine | — | 2 | — | — |
| Isocetyl Stearate | — | — | 2 | — |
| PPG$_{12}$PEG$_{50}$ Lanolin | — | — | — | 2 |
| Mercaptopropyl Trimethoxy Silane | 1 | 1 | 1 | 1 |
| Test results | | | | |
| Clarity | Clear | Clear | Clear | Clear |
| Viscosity (mPa · s, 25 C.) | | 7650 | 6760 | 7390 |
| Fiber Friction (g/mm) | | 7.7 | 11.4 | 7.2 |
| Crack Propagation (mm) | | 1.53 | 1.56 | 1.69 |
| Fiber Pull-out Residue Test | 2.3 | | | |

Table Notes:
The oligomers were formed by reacting the following components:
H = Hydroxyethyl Acrylate
I = Isophorone Diisocyanate
PTGL2000 = 2000 molecular weight polymethyltetrahydrofurfuryl/polytetrahydrofurfuryl copolymer diol (Mitsui, NY), the methyl group provides branching which reduces the orientation of the polymers formed from the oligomer 3) Radiation-Curable, Silicone Containing Oligomers and Use of Non-Radiation-Curable Silicone Compounds Radiation-curable, silicone containing monomers and oligomers can also be used to adjust the level of fiber friction and thereby improve ribbon strippability of the inner primary coating. The radiation-curable, silicone oligomer comprises a silicone compound to which at least one radiation-curable functional group is bound. Preferably, two or more radiation-curable functional groups are connected to the silicone entity.

Preferably the radiation-curable functional group is capable of copolymerizing with the radiation-curable monomers and oligomers present in the inner primary composition when exposed to suitable radiation. Therefore, the selection of the functional group will depend on the monomer or oligomer present in the inner primary composition. One skilled in the art will readily be able to determine which functional groups will cross-link with the monomer or oligomer present in the inner primary composition. While not being limited thereto, examples of suitable functional groups are groups containing vinyl, acrylate, methacrylate, maleate, vinyl ether, or acrylamides, as well as those described herein above.

Examples of commercially available silicone compounds containing a radiation-curable functional group are silicone acrylates Ebecryl 350 and Ebecryl 1360 (Radcure Industries), Tego Rad 2100, 2200, 2500, and 2600 (Tego Chemie), and Coat-O-Sil 3503 (OSI Specialties).

Alternatively, based on the teachings herein, one skilled in the art will be able to modify known silicone compounds to include the required radiation-curable functionality. For example, a silicone compound provided with hydroxy functionality can be reacted with a diisocyanate compound and a compound containing a hydroxy and a radiation-curable functionality to provide a radiation-curable functionality to said silicone compound. Specific examples include reacting a silicone compound containing a hydroxy functionality with a diisocyanate and hydroxyethylacrylate to provide an acrylate functionality on the silicone compound, or isocyanate and hydroxybutylvinylether to provide a vinyl ether functionality on the silicone compound. Example of suitable silicone compound containing hydroxyl functionality include: polydimethylsiloxane diol of 1200 equivalent weight Q4-3667, DC 193 and DC 1248 (Dow Corning), HSi2111 (Tego Chemie), and Coat-O-Sil 3500 and 3505 (Osi Specialties).

Alternatively, non-radiation-curable silicone compounds (hereinafter referred to as "non-reactive silicone") can be used to adjust the fiber friction and thereby improve ribbon strippability of the inner primary coating.

U.S. Pat. No. 4,496,210, which is incorporated herein by reference, discloses examples of suitable non-reactive silicones that can be used. Non-reactive silicones can be used separately or in conjunction with the radiation-curable silicone oligomers described herein.

The radiation-curable silicone oligomer and/or non-reactive silicone should be present in an amount to provide a fiber friction that results in a resistive force that is less than the cohesive strength of the inner primary composition. The amount of radiation-curable silicone oligomer and/or non-reactive silicone is preferably the minimum amount required to provide a fiber friction that results in a resistive force less than the cohesive strength of the inner primary composition. Such minimum amount can easily be determined by making test runs of inner primary compositions in which the amount of radiation-curable silicone oligomers and/or non-reactive silicones present is varied. The lowest amount of radiation-curable silicone oligomers and/or non-reactive silicones present which provides a fiber friction that results in a resistive force that is less than the cohesive strength of the inner primary coating is the preferred amount.

A long chain silicone compound containing on average about one radiation-curable functional group (monofunctional) bound near a terminus of the silicone compound can provide further advantages. The end of the long silicone chain furthest from the radiation-curable functional group can be mechanically bound in the inner primary coating. However, upon heating during ribbon stripping, it is believed that the end of the long silicone chain farthest from the radiation-curable functional group can become unbound and diffuse toward the optical glass fiber/inner primary coating interface which is in the direction the heat is propagating. This diffusion of silicone increases at the critical moment during ribbon stripping to facilitate the clean removal of the entire coating system. The silicone acts as a lubricant between the surface of the optical glass fiber and the inner primary coating.

The thickness of an inner primary coating usually varies from about 10 microns to about 35 microns. Thus, a mono-functionalized silicone fluid having a molecular chain length of about 50,000 to about 350,000 Daltons can diffuse toward the glass/inner primary coating interface during ribbon stripping.

Suitable amounts of radiation-curable silicone oligomers and/or non-reactive silicones can also be closely approximated by using the friction and crack propagation test methods described herein, in which the amounts of radiation-curable silicone oligomers and/or non-reactive silicones that provide a balance between adhesion and ribbon stripping cleanliness of less than about 3 are preferred.

The amount of radiation-curable silicone oligomer and/or non-reactive silicones will also depend on the selection of the inner primary composition, in particular the initial fiber friction of the selected inner primary coating composition. Generally, the higher the initial fiber friction (no slip additive), the greater the amount of radiation-curable silicone oligomer and/or non-reactive silicone that will be required to lower the fiber friction to a level that provides a resistive force lower than the cohesive strength of the inner primary coating.

In general, the radiation-curable silicone oligomers can be used in greater amounts than non-reactive silicones because it is believed that the radiation-curable silicone oligomer will become bound in the inner primary coating during curing, whereas the non-reactive silicone is free to migrate throughout the cured inner primary coating. Alternatively, the radiation-curable silicone oligomer can be the main oligomer used for forming the inner primary coating. It has been found that suitable amounts of radiation-curable silicone oligomer are between about 0.1 to about 90% by weight, preferably about 0.1 to about 60% by weight, and more preferably about 0.1 to about 30% by weight. In general, higher molecular weight radiation-curable silicone oligomers will be present in a radiation-curable coating in greater weight percentages than lower molecular weight composite oligomers.

Suitable amounts of mono-functionalized monomers have been found to be about 0.1 to about 20% by weight, more preferably about 0.1 to about 10% by weight, and most preferably about 0.1 to about 5% by weight.

Suitable amounts of non-reactive silicone are between about 0.01 to about 10% by weight, preferably about 0.01 to about 5% by weight, and more preferably about 0.01 to about 1% by weight.

The invention will be further explained by the following non-limiting examples illustrating the use of silicone entities.

EXAMPLE 3-1

The components shown in Table 3A were combined to form an inner primary coating composition. A film of the coating material (75 micron thick) was prepared on glass slides and then cured by exposure to UV light in the same manner as above. The tensile strength, elongation and modulus were measured.

A 75 micron film of the coating material was also prepared and suitably cured. The crack propagation was then measured. A friction test was also conducted, as described herein. The results are shown in Table 3A.

TABLE 3A

| Component (wt. %) | Example 3-1 |
|---|---|
| Oligomer H-DesW-PTHF2900-DesW-H | 47.5 |
| Ethoxylated Nonylphenol Acrylate | 29 |
| Lauryl Acrylate | 14.2 |
| 2,4,6-Trimethyl Phenylbenzoyl Diphenyl Phosphine Oxide | 3 |
| Silicone Oligomer H-I-HSi2111-I-H | 5 |
| γ-Mercaptopropyltrimethoxy Silane | .8 |
| Thiodiethylene Bis(3,5-di-tert-Butyl-4-Hydoxy)Hydocinnamate | .5 |
| Test Results | |
| Viscosity, mPa · s (25 C.) | 6040 |
| Tensile Strength, MPa | 1 |
| Elongation, % | 140 |
| Modulus, Mpa | 1.4 |
| Dose at 95%, Modulus, J/cm$^2$ | .38 |
| Crack Propagation (mm) | 1.7 |
| Fiber Pull-Out Friction (g/mm) | 17.1 |

Table Notes:
The oligomers were formed by reacting the following components:
H = Hydroxyethyl Acrylate;
DesW = bis 4,4-(isocyanatocyclohexyl)methane;
I = Isophorone Diisocyanate;
PTHF2900 = 2900 molecular weight Polytetramethylene Ether (BASF); and
HSi2111 = a silicone diol having a MW of 1000 (Tego Chemie).

EXAMPLES 3-2 THROUGH 3-10

The components shown in Table 3B were combined to form 11 different inner primary coating compositions. The viscosity and clarity of the compositions was determined.

Films of the coating materials (75 micron thick) were prepared on microscope slides and then cured by exposure to UV light in the same manner as above. The tensile strength, elongation and modulus were measured.

Additional films of the coating materials were also prepared and suitably cured. The crack propagation was then measured. A friction test was also conducted, as described herein. The results are shown in Table 3B.

TABLE 3B

| Component (wt. %) | Ex. 3-2 | Ex. 3-3 | Ex. 3-4 | Ex. 3-5 | Ex. 3-6 | Ex. 3-7 | Ex. 3-8 | Ex. 3-9 | Ex. 3-10 |
|---|---|---|---|---|---|---|---|---|---|
| Oligomer H-I-PTHFCD2000-I-PTHFCD2000-I-H | 45.67 | | | | | | | | |
| Oligomer H-(I-PPG1025)$_{1.06}$-(I-PERM)$_{1.14}$-I-H | | | 54.86 | | | | | | |
| Oligomer H-I-PTGL2000-I-H | | | | | 60.65 | | | | |
| Oligomer H-I-PPG2010-I-PPG2010-I-H | | 67.5 | | 70 | | | | | |
| Oligomer H-I-PTGL2000-I-PTGL2000-I-H | | | | | | 51.02 | 49.23 | | 43 |
| Oligomer (H-I)$_3$-TPE4542 | | | | | | | | 78 | |
| Ethoxylated Nonylphenol Acrylate Ester | 34.48 | | 24.99 | | 32.85 | 20.14 | 24.75 | 16 | 50.5 |
| Lauryl Acrylate | 14.35 | | 13.72 | | | 6.92 | 16.64 | | |
| Phenoxyethyl Acrylate | | | | | | 16.62 | | | |
| 2.5 Mole Propoxylated Nonyl Phenol Acrylate | | 25.00 | | 23.5 | | | | | |
| 25:75 weight/weight of Bis(2,6-Dimethoxybenzoyl)(2,4,4-Trimethylpentyl) Phosphine Oxide and 2-Hydroxy-2-Methyl-1-Phenyl Propanone | | | 2.94 | 3 | | | | | |
| 2,4,6-trimethylbenzoyl Diphenyl Phosphine Oxide | 3 | | | | 2.5 | 3 | 3 | 1 | 3 |
| 1-Hydroxycyclohexyl Phenyl Ketone | | 4 | | | | | | 2 | |

TABLE 3B-continued

| Component (wt. %) | Ex. 3-2 | Ex. 3-3 | Ex. 3-4 | Ex. 3-5 | Ex. 3-6 | Ex. 3-7 | Ex. 3-8 | Ex. 3-9 | Ex. 3-10 |
|---|---|---|---|---|---|---|---|---|---|
| Octadecyl 3,5-Bis(1,1-Dimethylethyl)-4-Hydroxybenzenepropanone | .5 | .5 | | | | | | | |
| Thiodiethylene bis(3,5-di-Tert-Butyl-4-Hydroxy)hydrocinnamate | | | .49 | | .5 | .3 | | | .5 |
| Ditridecylthiodipropionate | | 1 | | 1 | | | | | |
| Free Silicone, DC-193 (Dow Corning) | | 1 | 2 | 1 | | | | 2 | 2 |
| Free Silicone, DC-190 (Dow Corning) | 1 | | | | | | | | |
| Tegorad 2100 | | | | | 2.5 | 1 | 5 | | |
| L-77 Polyethylene oxide modified Dimethylsiloxane | | | | | | | | | |
| 1-Propanethiol,3-(Trimethoxysilyl) | 1 | 1 | .98 | 1 | 1 | 1 | .92 | 1 | 1 |
| Clarity When Made | clear | clear | clear | clear | | | | clear | |
| Clarity After 24 Hours at 4 C. | clear | | clear | clear | | | | | |
| Clarity After 24 Hours at −20 C. | clear | | clear | clear | | | | | |
| Clarity After 3 Days at 60 C. | clear | | clear | clear | | | | | |
| Viscosity (mPa · s, 25 C.) | 8700 | | 5600 | 8000 | 9520 | 7170 | 6240 | 8200 | |
| Dose @ 95% Modulus (J/cm²) | .77 | .46 | .45 | .32 | .36 | .45 | | .2 | |
| Tensile Strength (MPa) | | .4 | | | 1.5 | .6 | 1.1 | | |
| Elongation (%) | | 50 | | | 100 | 140 | 180 | | |
| Modulus (MPa) | | 1.2 | | | 2.7 | 1.1 | 1.3 | 2.4 | |
| Fiber Friction (g/mm) | 3.1 | 4.9 | 2.7 | 4.4 | 21 | 18.4 | 18.5 | 3 | 3.4 |
| Fiber Friction (g/mm) After 7 days, 60 C., dose 95% of dose required for complete cure | | | 1 | 1.4 | | | | | |
| Crack Propagation (mm) | 2.1 | 1.49 | 1 | 1.4 | 1.21 | 1.82 | 1.47 | 1.1 | 1.9 |
| Crack propagation (mm) after 7 days, 60 C., dose 95 of dose required for complete cure | | | 1.1 | | | | | | |

Table Notes:
The oligomers were formed by reacting the following components:
H = Hydroxyethyl Acrylate;
I = Isophorone Diisocyanate;
PTHFCD2000 = is PolyTHF containing some carbonate linkages;
PPG1025 = is Polypropyleneoxidediol having an average molecular weight of 1000 (Arco);
PPG2010 = is Polypropyleneoxidediol having an average molecular weight of 2000 (BASF);
PTGL2000 = 2000 molecular weight polymethyltetrahydrofurfuryl/polytetrahydrofurfuryl copolymer diol (Mitsui, NY);
TPE4542 = polypropylene glycol ethylene oxide endcapped triol (BASF);
Perm = Permanol KM10-1733 polycarbonate/polyether copolymer diol 4) Radiation-curable Fluorinated Oligomers and Fluorinated Materials The fiber friction between the inner primary coating and the surface of the optical glass fiber can also be significantly reduced by incorporating radiation-curable fluorinated oligomers, monomers and/or non-radiation curable fluorinated materials into the inner primary coating composition. The radiation-curable, fluorinated oligomer or monomer comprises a fluorinated compound to which at least one radiation-curable functional group is bound. Preferably, two or more radiation-curable functional groups are connected to the fluorinated entity.

Preferably the radiation-curable functional group is capable of copolymerizing with the radiation-curable monomers and oligomers present in the inner primary composition when exposed to suitable radiation. Therefore, the selection of the functional group will depend on the monomer or oligomer present in the inner primary composition. One skilled in the art will easily be able to determine which functional groups will cross-link with the monomer or oligomer present in the inner primary composition. While not being limited thereto, examples of suitable radiation-curable functional groups are groups containing vinyl, acrylate, methacrylate, maleate, vinyl ether, or acrylamides, as well as those described herein above.

Examples of commercially available fluorinated compounds containing at least one radiation-curable functional group include perfluoro ethyl acrylate (DuPont), 2-(N-Ethylperfluoro Octane Sulfonamido)Ethyl Acrylate (3M), 1H,1H-pentadecafluoroctyl acrylate (Oakwood Research Chemicals), as well as methacrylate or N butyl acrylate versions of these.

Based on the teachings herein, one skilled in the art will be able to modify a fluorinated compound to include the required radiation-curable functionality. For example, a fluorinated compound provided with hydroxy functionality can be reacted with a diisocyanate compound and a compound containing a hydroxy and a radiation-curable functionality to provide a radiation-curable functionality to said fluorinated compound. Specific examples include reacting a fluorinated compound containing a hydroxy functionality with a diisocyanate and hydroxyethylacrylate to provide an acrylate functionality on the fluorinated compound, or isocyanate and hydroxybutylvinylether to provide a vinyl ether functionality on the fluorinated compound. Examples of suitable fluorinated compounds containing hydroxyl functionality include Fluorolink E (Ausimont), 2-methyl 4,4,4-trifluorobutanol, 1H,1H-pentadecafluoro-1-octanol, 1H,1H-pentafluoropropanol-1, and 1H,1H, 12H,12H-perfluoro-1,12-dodecanediol (Oakwood Research Chemicals).

Alternatively, non-radiation-curable fluorinated compounds (hereinafter referred to simply as "fluorinated compounds") can be used to adjust the fiber friction and thereby improve ribbon strippability of the inner primary.

The fluorinated compounds can be used separately or in conjunction with the radiation-curable silicone oligomers or monomers described herein.

The radiation-curable fluorinated oligomer or monomer and/or fluorinated compounds should be present in an amount to provide a fiber friction that results in a resistive force that is less than the cohesive strength of the inner primary composition. The amount of radiation-curable fluorinated oligomer and/or fluorinated compound is preferably the minimum amount required to provide a fiber friction that results in a resistive force less than the cohesive strength of the inner primary composition. Such minimum amount can easily be determined by making test runs of inner primary compositions in which the amount of radiation-curable fluorinated oligomers or monomers and/or fluorinated present is varied. The lowest amount of radiation-curable fluorinated oligomers or monomers and/or fluorinated compounds present which provides a fiber friction that results in a resistive force less than the cohesive strength of the inner primary coating is the preferred amount.

Suitable amounts of radiation-curable fluorinated oligomers or monomers and/or fluorinated compounds can also be closely approximated by using the friction and crack propagation test methods described herein.

The amount of radiation-curable fluorinated oligomer or monomers and/or fluorinated compounds will also depend on the selection of the inner primary composition, in particular the initial fiber friction of the selected inner primary coating composition. Generally, the higher the initial fiber friction (no slip additive), the greater the amount of radiation-curable fluorinated oligomer or monomer and/or fluorinated compounds that will be required to lower the fiber friction to a level that provides a resistive force lower than the cohesive strength of the inner primary coating.

In general, the radiation-curable fluorinated oligomers or monomers can be used in greater amounts than non-reactive fluorinated compounds because it is believed that the radiation-curable fluorinated oligomers or monomers will become bound in the inner primary coating during curing, whereas the non-reactive fluorinated compounds are free to migrate throughout the cured inner primary coating. Alternatively, the radiation-curable fluorinated oligomer or monomer can be the main oligomer used for forming the inner primary coating. It has been found that suitable amounts of radiation-curable fluorinated oligomer or monomer are between about 0.1 to about 90% by weight, preferably about 0.1 to about 60% by weight, and more preferably about 0.1 to about 30% by weight. In general, larger molecular weight oligomers can be used in greater amounts than lower molecular weight oligomers or monomers.

Suitable amounts of fluorinated compounds have been found to be between about 0.01 to about 10% by weight, preferably about 0.01 to about 5% by weight, and more preferably about 0.01 to about 1% by weight.

The invention will be further explained by the following non-limiting examples illustrating the use of fluorinated materials.

EXAMPLES 4-1 THROUGH 4-3

The components shown in Table 4 were combined to form different inner primary coating compositions. The tests results for these compositions are also set forth in Table 4.

TABLE 4

| Component (wt. %) | Ex. 4-1 | Ex. 4-2 | Ex. 4-3 |
| --- | --- | --- | --- |
| Oligomer H-(I-PPG1025)$_{1.06}$-(-PERM)$_{1.14}$-I-H | 54.32 | | 55.58 |
| Oligomer H-(I-PPG2010)$_2$-I-H | | 67.75 | |
| Ethoxylated Nonylphenol Acrylate Ester | 24.74 | | 25.31 |
| Isodecyl Acrylate | 13.58 | | 13.9 |
| 2.5 Mole Propoxylated Nonyl Phenol Acrylate | | 25 | |
| 25:75 weight/weight of Bis(2,6- | 2.91 | | 3 |

TABLE 4-continued

| Component (wt. %) | Ex. 4-1 | Ex. 4-2 | Ex. 4-3 |
| --- | --- | --- | --- |
| Dimethoxybenzoyl)(2,4,4-Trimethyl-pentyl) Phosphine Oxide and 2-Hydroxy-2-Methyl-1-Phenyl Propanone | | | |
| 1-Hydroxycyclohexyl Phenyl Ketone | | 4 | |
| Octadecyl 3,5-Bis(1,1-Dimethylethyl)-4-Hydroxybenzenepropanone | | 0.50 | |
| Thiodiethylene bis(3,5-di-tert-butyl-4-hydroxy)Hydrocinnamate | .48 | | .5 |
| Ditridecylthiodipropionate | | 1.00 | |
| Foralkyl EM-6 Tridecafluorooctyl Mecaptan (Elf Atochem) | 3.00 | | |
| Fluorosulfonamide (3M) | | 0.75 | .75 |
| γ-Mercaptopropyl trimethoxy silane | 0.97 | 1 | 1 |
| Clarity as made | Clear | Clear | Clear |
| Clarity after 24 hours at 4° C. | | | Clear |
| Clarity after 24 hours at –20° C. | | | Clear |
| Clarity after 3 days at 60° C. | | | Very Few Incompat's |
| Viscosity (mPa · s, 25 C.) | | | 6200 |
| Dose @ 95% Modulus (J/sq. cm) | .77 | 0.50 | .47 |
| Tensile Strength (MPa) | | 0.50 | |
| Elongation (%) | | 88 | |
| Modulus (MPa) | | 1.20 | |
| Fiber Friction (g/mm) | 25.5 | 8.2 | 10.5 |
| Fiber Friction (g/mm) After 7 days, 60 C., at dose of 95% of dose for complete cure | | | 1.1 |
| Crack Propagation (mm) | 1.32 | 1.54 | 1.1 |
| Crack Propagation (mm) after 7 days, 60 C., at dose of 95% of dose for complete cure | | | 1 |

Table Notes:
The oligomers were formed by reacting the following components:
H = Hydroxyethyl Acrylate;
I = Isophorone Diisocyanate;
PG1025 = is Polypropyleneoxidediol having an average molecular weight of 1000 (Arco);
PPG2010 = is Polypropylenediol having an average molecular weight of 2000 (BASF);
PTGL2000 = 2000 molecular weight polymethyltetrahydrofurfuryl/polytetra-hydrofurfuryl copolymer diol (Mitsui, NY); and
Perm = Permanol KM10-1733 polycarbonate/polyether copolymer diol.

5) Solid Lubricants

Solid lubricants can be added to the inner primary composition to reduce the fiber friction between the inner primary coating and the surface of the optical glass fiber. The term "solid lubricant" is used herein to mean that the lubricant is substantially insoluble in the inner primary composition and that the particle or flake shape of the solid lubricant is substantially maintained after curing of the inner primary coating composition.

Usually the solid lubricant is non-reactive with the components of inner primary coating composition. Examples of suitable non-reactive solid lubricants include solid organic lubricants including organic polysaccharides such as sodium alginate, polyolefins, polyvinyl alcohol, nylon such as Orgasol (Elf Atochem), solid Teflon particles, and hard waxes such as Rad Wax; solid inorganic lubricants including molybdenum disulfide, graphite, silicates such as talc, clays such as kaolin and mica, silica, and boron nitride.

However, if desired, a reactive solid lubricant can be used. Reactive solid lubricants contain a radiation-curable functional group. Preferably, the radiation-curable functional group is capable of copolymerizing with the radiation-curable monomers or oligomers present in the inner primary composition. The radiation-curable functional group can be, for example, any of the radiation-curable functional groups described herein. Specific examples of suitable reactive solid lubricants include zinc acrylate, molybdenum acrylate, aluminum acrylate, barium acrylate, and chromium acrylate.

The particle size is preferably small enough to avoid microbending caused by the solid particles exerting stresses on the surface of the optical glass fiber during use. Furthermore, the particle size is preferably small enough to avoid causing the inner primary coating to be hazy in appearance. Examples of suitable particle sizes have been found to be about 10 microns or less, preferably about 5 microns or less, and most preferably less than about 2 microns.

Alternatively to the particle size, the hardness of the solid lubricant is preferably low enough to avoid microbending caused by the solid particles exerting stresses on the surface of the optical glass fiber during use. In general, a softer solid lubricant will be less likely to cause such microbending.

Based on the teachings provided herein, one skilled in the art will easily be able to select a solid lubricant in an amount to provide the desired level of fiber friction between the inner primary coating and the surface of the optical glass fiber. The amount of the solid lubricant present in the inner primary composition will depend on the ability of the solid lubricant to impart the desired reduction in the fiber friction between the inner primary coating and the surface of the optical glass fiber, and the amount the fiber friction must be reduced to provide a fiber friction level that still maintains sufficient adhesion. In general, the greater the ability of the solid lubricant to reduce fiber friction, the less solid lubricant that will be required. Preferably, the amount of solid lubricant present is about the minimum amount necessary to provide a level of fiber friction necessary to provide a clean, residue free optical glass fiber after ribbon stripping. As discussed above, the fiber friction level that will provide a clean, optical glass fiber after ribbon stripping will depend on the cohesive strength of the inner primary coating.

It has been found that suitable amounts of solid lubricant include from about 0.1% to about 20% by weight of the total inner primary composition, more preferably about 0.1% to about 10%, and most preferably about 0.1% to about 5%.

Preferably, a surfactant is used in combination with the solid lubricant. Examples of a suitable surfactants include; fluorosulfonamide surfactant (3M), 3,6-dimethyl octyne-3, 6-diol (Air Products), linear copolymer of vinylpyrolidone and long chain alpha olefin (International Specialty Products), Solsperse high MW polymeric dispersing agents (Zeneca), and other well-known anionic, cationic and non-ionic surfactants.

The invention will be further explained by the following non-limiting examples.

EXAMPLES 5-1 THROUGH 5-3

The components shown in Table 5 were combined to form different inner primary coating compositions. The tests results for these compositions are also set forth in Table 5.

TABLE 5

| Component (wt. %) | Ex. 5-1 | Ex. 5-2 | Ex. 5-3 |
| --- | --- | --- | --- |
| Oligomer H-(I-PTGL2000)$_2$I-H | 36.1 | 42.3 | 36.1 |
| Ethoxylated Nonylphenol Acrylate | 44.4 | 46. 1 | 43.9 |
| Phenoxyethyl Acrylate | 5 | 5 | 5 |
| 2,4,6-trimethylbenzoyl Diphenyl Phosphine Oxide and 2-Hydroxy-2-Methyl-1-Phenyl-1-Propanone blend | 3 | 3 | 3 |
| Thioethylene bis(3,5-di-tert-butyl-4-Hydroxy)Hydrocinnamate | .5 | .5 | .5 |
| γ-Mercaptopropyltrimethoxy Silane | 1 | 1 | 1 |
| Rad Wax 62EB (33% PE wax in epoxy acrylate) | 10 | | |
| Fluorosulfonamide Surfactant FC-430 (3M) | | .1 | .5 |
| Fluoro A (Micronized PTFE) | | 2 | 10 |
| Test results | | | |
| Clarity | yes | yes | yes |
| Color | white | white | white |
| Viscosity, mPa · s at 25° | 5440 | 7960 | 7520 |
| Film Opacity, 3 mil | opaque | cloudy | cloudy |
| Fiber Friction (g/mm) | 15.2 | 8.2 | 6.6 |
| Crack Propagation (mm) | | 1.96 | 2.2 |

Table notes:
The oligomers were formed by reacting the following components:
H = Hydroxyethyl Acrylate;
I = Isophorone Diisocyanate;
PTGL2000 = 2000 molecular weight polymethyltetrahydrofurfuryl/polytetrahydrofurfuryl copolymer diol (Mitsui, NY); and
Perm = Permanol KM10-1733 polycarbonate/polyether copolymer diol 6) Linear Oligomers The ability of a ribbon assembly to strip cleanly during ribbon stripping can be further improved if the inner primary coating compositions comprises at least one linear, radiation-curable oligomer. Examples of linear, radiation-curable oligomers according to the present invention that provide enhanced strippability include those represented by the following formula:

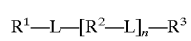

$$R^1\text{—}L\text{—}[R^2\text{—}L]_n\text{—}R^3$$

wherein:
$R^1$–$R^3$ independently represent an organic group having radiation-curable functional groups as defined herein, preferably $R^2$ represents a substantially linear carbon-containing entity;

each L independently represents a linking group, providing a bridging group such as a urethane, thio-urethane, urea or ester grouping, as defined herein, preferably urethane; and n represents a value from 0 to about 40, preferably about 1 to about 20, and most preferably about 1 to about 10, wherein the molecular weight of $[R^2\text{—}L]_n$ is about 500 to about 20,000, preferably about 1,000 to about 10,000, and most preferably about 1,500 to about 6,000.

When n is 1, $[R^2\text{—}L]$ may represent, for example, a polyolefin, polyether, polycarbonate, or polyester structure having a molecular weight of about 500 to about 20,000. When n is from about 2 to about 5, $[R^2\text{—}L]$ may represent, for example, a polyolefin, polyether, polycarbonate, or polyester having a molecular weight of about 500 to about 10,000. When n is from about 5 to about 30, $[R^2\text{—}L]$ may represent, for example, a polyolefin, polyether, polycarbonate, or polyester having a molecular weight of about 500 to about 4,000.

The linear oligomers according to this invention can be used in an amount suitable to provide the desired level of ribbon stripping performance. The desired amount can easily be found and determined by one skilled in the art by testing different amounts of the selected linear oligomer(s) in an inner primary coating, and optionally in an outer primary coating as well, on optical glass fibers encased in a ribbon assembly. It has generally been found that the linear oligomers according to this invention can be used in amounts of about 0.1 to about 90 wt. %, preferably about 5 to about 80 wt. %, more preferably about 5 to about 60 wt. %, based on the total weight of the inner primary or outer primary composition.

EXAMPLE 6-1 THROUGH 6-2

The components shown in Table 6 were combined to form inner primary coating compositions. The compositions were cured and the fiber pull-out friction of the cured coating was measured, as defined herein. The test results are shown in Table 6.

TABLE 6

| Component (wt. %) | Example 6-1 | Example 6-2 |
|---|---|---|
| Oligomer H-(I-PTHF2000)$_2$-I-H | 52.26 | 52.26 |
| Ethoxylated Nonylphenol Acrylate | 15.7 | 15.67 |
| Lauryl Acrylate | 15.19 | 16.19 |
| n-Vinyl Formamide Isobornyl Acrylate | 11.8 | 0 |
| n-Vinyl Formamide Ethylhexyl Acrylate | 0 | 10.8 |
| 25:75 weight/weight of Bis(2,6-Dimethoxybenzoyl)(2,4,4-Trimethylpentyl) Phosphine Oxide and 2-Hydroxy-2-Methyl-1-Phenyl Propanone | 3.7 | 3.7 |
| gamma-Mercaptopropyl Trimethyoxy Silane | 0.92 | 0.92 |
| Thioethylene Bis(3,5 di-tert-butyl-4-hydroxyl) Hydrocinnamate (antioxidant) | .46 | .46 |

Table Notes:
The oligomer was formed by reacting the following components:
H = Hydroxyethyl Acrylate;
I = Isophorone Diisocyanate; and
PTHF2000 = 2000 molecular weight Polytetramethylene Ether Glycol (BASF)

7) Terminal Linear Moieties

It has been found that the use of radiation-curable oligomers containing at least one terminal linear moiety can also improve the efficiency of the inner primary coating to assist in providing a better stripping of a ribbon assembly.

Examples of radiation-curable oligomers according to the present invention that provide enhanced strippability include those represented by the following formula:

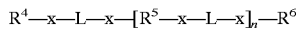

$$R^4-x-L-x-[R^5-x-L-x]_n-R^6$$

wherein
- $R^4$ represents a substantially linear long chain alkyl terminating in at least one hydroxyl group;
- each L independently represents a molecular bridging group, preferably derived from a diisocyanate precursor reactant;
- each x independently represents a resulting reacted linking group, such as, inter alia, a urethane, thio-urethane, or urea entity, alternatively, ester linkages can also be utilized;
- $R^5$ represents a linear or branched or cyclic hydrocarbon or polyether moiety derived from a diol and having a molecular weight of from 150 to 10,000, preferably from 500 to 5,000, and most preferably from 1,000 to 2,000 Daltons;
- $R^6$ represents an end group carrying a radiation-curable functional group as defined herein, preferably an acrylate or methacrylate, and also having an hydroxyl linkage to the L entity.

$R^4$ preferably has at least about 80%, more preferably at least about 90%, of its carbon atoms in a straight chain; and, n may represent a number from zero to 30. Preferably, $R^4$ represents about a $C_9$–$C_{20}$ alkyl radical. Longer carbon chains may decrease the resistance against oil. Suitable examples of alkyls are lauryl, decyl, isodecyl, tridecyl, and stearyl. Most preferred is lauryl.

$R^5$ represents $C_6$–$C_{15}$ branched or cyclic aliphatic group having about 6 to about 15 carbon atoms. In particular, $R^5$ may represent an aliphatic component of a diisocyanate compound such as isophorone diisocyanate, DesW, TMDI, and HXDI. If $R^5$ is a branched component, preferably, the extent of branching units is at least about 10 mole %, and more preferably at least about 20 mole %, based on the total number of carbon atoms in $R^5$.

The oligomers according to above formula can be made, for example, by reacting in a first reaction one mole of a diisocyanate compound (for forming $R^5$) with (1) one mole of a long chain alkyl containing a hydroxy group (for forming $R^4$) or (2) one mole of a compound containing a hydroxy functional group and a radiation-curable functional group (for forming $R^6$). The urethane linking group "x" attached to "L" is formed by the reaction of the isocyanate group with a hydroxyl group. In a second reaction, the remaining isocyanate group is reacted with the other as yet un-reacted hydroxyl group of the compound. Reactions of hydroxy functional compounds with isocyanate functional molecules are well known in the art, and can be catalyzed if needed, with known catalysts. Suitable examples of reactants containing a radiation-curable functional group and a hydroxy group are hydroxyethylacrylate or 2-hydroxypropylacrylate. Suitable examples of linear long chain alkyls include lauryl alcohol, decyl alcohol, isodecyl alcohol, tridecyl alcohol, and stearyl alcohol.

The resulting radiation-curable oligomer can be used in optical fiber coating compositions, in particular in inner primary coatings, as a monomer that enhances the strippability of a ribbon assembly comprising at least one optical fiber coated with a compositions having such an oligomer. In addition, compositions comprising at least one of these oligomers may also experience a faster cure speed.

It has been found that when at least one terminal linear oligomer is present in amounts of about 1 to about 90 wt. %, preferably about 5 to about 80 wt. %, and most preferably about 5 to about 60 based on the total weight of the inner primary or outer primary composition.

8) Aromatic Groups

Ribbon strippability can also be enhanced by incorporating a high concentration of aromatic groups in the oligomers and monomers used to form the inner primary coating. It will be appreciated that coating compositions comprising about 0.1 or more moles of aromatic groups per 100 grams of total composition, calculated using the molecular weights of the compositional components, are regarded as having a high concentration of aromatic groups. It is believed that the planarity of the phenyl ring next to the surface of the optical glass fiber may allow for the good slidability of the inner primary coating off the optical glass fiber during ribbon stripping.

EXAMPLE 8-1

The components shown in Table 8 were combined to form different inner primary coating compositions. The tests results for these compositions are also set forth in Table 8.

TABLE 8

| Component (Amount is % by weight of total composition) | Example 8-1 |
|---|---|
| Oligomer H-I-(PTGL2000-I)$_2$-H | 51.54 |

TABLE 8-continued

| Component<br>(Amount is % by weight of total composition) | Example 8-1 |
|---|---|
| Ethoxylated Nonylphenol Acrylate | 20.86 |
| Phenoxyethyl Acrylate | 16.8 |
| Lauryl Acrylate | 7 |
| 25:75 weight/weight of Bis(2,6-Dimethoxybenzoyl)(2,4,4-Trimethylpentyl) Phosphine Oxide and 2-Hydroxy-2-Methyl-1-Phenyl Propanone | 2.5 |
| Thiodiethylene Bis(3,5-di-tert-butyl-gamma-hydroxy) Hydrocinnamate | 0.3 |
| gamma-Mercaptopropyl Trimethoxy Silane | 1 |
| Test Results | |
| Crack Propagation (mm) | 1.49 |
| Fiber Pull-Out Friction (g/mm) | 10 |

Table Notes:
The oligomer was formed by reacting the following components:
H = Hydroxyethyl Acrylate;
I = Isophorone Diisocyanate; and
PTGL2000 = 2000 molecular weight polymethyltetrahydrofurfuryl/polytetrahydrofurfuryl copolymer diol (Mitsui, NY)

9) High Molecular Weight Polymeric Blocks and Reduced Concentration of Urethane

Radiation-curable, inner primary optical glass fiber coating compositions (hereinafter referred to as "inner primary compositions") are now well known in the art. Such inner primary compositions usually contain at least one radiation-curable oligomer, and optionally reactive diluents, photoinitiators, and additives, as described herein above.

It has now been found that by reformulating the radiation-curable oligomer used in the inner primary composition, an inner primary coating can be formed having a significantly increased crack propagation in combination with a significantly decreased fiber friction, Furthermore, it has been found that the crack propagation can be increased and the fiber friction decreased to levels which provide the inner primary coating with the ability to strip cleanly from the surface of an optical glass fiber during ribbon stripping, without the use of substantial amounts of slip agents in the inner primary coating. In some instances, the use of slip agents can be substantially avoided. The term slip agents includes components which are separate and distinct from the radiation-curable oligomer as well as slip agent moieties that can be bound to the radiation-curable oligomer. The use of slip agents may cause undesirable delamination of the inner primary coating during use of the ribbon assembly in hot and wet environments, such as tropical environments, which can lead to microbending and attenuation of the signal transmission. Thus, by substantially avoiding the use of slip agents to provide a ribbon-strippable inner primary coating, the present invention can provide a ribbon-strippable inner primary coating which exhibits enhanced resistance to such undesirable delamination.

Radiation-curable, oligomers comprising a carbon containing backbone to which at least one radiation-curable functional group is bound are well known in the art. Usually, the carbon containing backbone of the radiation-curable oligomer contains one or more polymeric blocks each having a molecular weight up to about 2000 and being connected together via coupling groups. Thus, an oligomer having a molecular weight of about 6000, will usually contain three polymeric blocks each having a molecular weight of about 2000 which are connected via coupling groups. The radiation-curable functional groups are also usually connected to the carbon-containing backbone via coupling groups.

By extensive experimentation, it has now been found that as the molecular weight of the polymeric blocks is increased, the crack propagation of the inner primary coating increases and the fiber friction of the inner primary coating decreases. The molecular weight of the polymeric blocks should be adjusted up to level which provides an inner primary coating having a fiber friction and crack propagation that are suitable for ribbon stripping. Alternatively, the molecular weight of the polymeric block can be adjusted upward to level which provides an inner primary coating having a fiber friction of about 30 g/mm or less at a rate of 0.1 mm/sec in combination with a crack propagation of at least about 1.3 mm at a rate of 0.1 mm/sec, at a ribbon stripping temperature. Preferably, the fiber friction is about 25 g/mm or less and more preferably about 20 g/mm or less. Preferably, the crack propagation is at least about 1.5 mm and more preferably at least about 2 mm. The crack propagation is usually below about 4, but can be higher.

It has been found that by using polymeric blocks having a molecular weight greater than 2000, preferably at least about 2500, and most preferably at least about 3000, inner primary coatings having a fiber friction and a crack propagation as described above can be provided. The molecular weight of said polymeric block is usually less than about 10,000, preferably less than about 8,000.

The coupling groups can be any group capable of providing a link between polymer blocks and/or between radiation-curable functional groups and polymer blocks. Examples of suitable coupling groups are urethane, urea and thiourethane. For purposes of practicing the present invention, which relates to adjusting the crack propagation and fiber friction using the molecular weight of the polymeric blocks and/or urethane concentration, the following groups are not considered coupling groups when determining the molecular weight of the polymeric blocks: carbonate, ether, and ester groups. Thus, when determining the molecular weight of the polymeric block, ether groups, carbonate groups, and ester groups are considered part of the polymeric block. Polymeric compounds separated by urethane, thiourethane and urea groups are considered separate polymeric blocks. Urethane is the preferred coupling group.

Usually, urethane groups are used as the coupling groups in the radiation-curable oligomer. For example, if an oligomer having a number average molecular weight about 6000 comprising 3 polymer blocks, each having a number average molecular weight of about 2000, and containing 2 radiation-curable functional groups, will have four urethane linkages. Two of the urethane linkages connect the radiation-curable groups to the polymeric blocks and two of the urethane linkages connect the three polymeric blocks together.

It has now been found that as the concentration of urethane linkages present in the inner primary composition is decreased, the crack propagation of the inner primary coating increases and the fiber friction of the inner primary coating decreases. Thus, the term urethane concentration represents the weight percentage of all urethane linkages present in the inner primary coating composition, based on the total weight of the inner primary coating composition.

Based on this discovery, the urethane concentration should be adjusted downward to a level which provides an inner primary coating having a fiber friction and crack propagation that are suitable for ribbon stripping the desired ribbon assembly. It has been found that if the calculated concentration of urethane linkages is about 3.5% by weight or less, relative to the total weight of the composition, inner primary coatings in conjunction with a relatively high modulus outer primary coating provide good ribbon strippability. Preferably, the urethane concentration is about 3.0% by weight or less, more preferably about 2.5% or less by weight, and most preferably about 2% or less by weight. The urethane concentration effect on fiber friction and crack propagation is more pronounced for higher molecular weight oligomers, such as about 3,000 to about 10,000, more preferably about 3,500 to about 8,000. Thus, preferably the urethane oligomer has a molecular weight of about 3,000 to about 10,000 in combination with a urethane concentration of about 3.5% by weight or less, more preferably, a molecular of about 3,500 to about 8,000 in combination with a urethane concentration of about 3.5% or less, and most preferably, a molecular weight of about 3,500 to about 8,000 in combination with a urethane concentration of about 3% or less.

The polymeric blocks can comprise for example polyethers, polyolefins, polycarbonates, polyesters, polyamides or copolymers thereof. Preferably, the polymeric blocks comprise polyethers.

The radiation-curable functional groups used can be any functional group capable of polymerization when exposed to actinic radiation. Suitable radiation-curable functional groups are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or styrene functionality, and most preferably acrylate or methacrylate.

Another type of radiation-curable functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The radiation-curable oligomer can be easily formed by reacting a polymeric polyol, a compound containing a radiation-curable functional group and a hydroxyl group, and a polyisocyanate. The general reaction of isocyanate functional groups with hydroxyl groups to form urethane linkages is well known in the art. Thus, one skilled in the art will be able to make the improved oligomer according to the present invention based on the disclosure provided herein.

Examples of suitable polymeric polyols that can be used to form the radiation-curable oligomer include polyether diols, polyolefin diols, polyester diols, polycarbonate diols, and mixtures thereof. Polyether and polycarbonate diols, or combinations thereof, are preferred. The polymeric block is the residue of the polymeric polyol after reaction to form the radiation-curable oligomer.

If a polyether diol is used, preferably the polyether is a substantially non-crystalline polyether. Preferably, the polyether comprises repeating units of one or more of the following monomer groups:

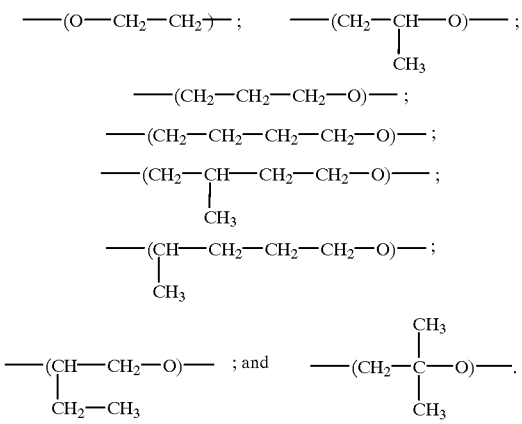

Thus, suitable polyethers can be made from epoxy-ethane, epoxy-propane, tetrahydrofuran, methyl-substituted tetrahydrofuran, epoxybutane, and the like. Commercial examples of a suitable polyether polyols that can be used are PTGL2500, PTGL3000, PTGL3500, and PTGL4000 (Hodogaya Chemical Company).

If a polyolefin diol is used, the polyolefin is preferably a linear or branched hydrocarbon containing a plurality of hydroxyl end groups. The hydrocarbon provides a hydrocarbon backbone for the oligomer. Preferably, the hydrocarbon is a non-aromatic compound containing a majority of methylene groups (—CH$_2$—) and which can contain internal unsaturation and/or pendent unsaturation. Examples of suitable hydrocarbon diols include, for example: hydroxyl-terminated;
fully or partially hydrogenated 1,2-polybutadiene; copolymers of 1,4-polybutadiene;
copolymers of 1,2-polybutadiene;
polyisobutylene polyol;
mixtures thereof, and the like. Preferably, the hydrocarbon diol is a substantially, fully hydrogenated 1,2-polybutadiene-ethene copolymer or 1,2-polybutadiene-ethene copolymer.

Examples of polycarbonate diols are those conventionally produced by the alcoholysis of diethylene carbonate with a diol.

Examples of polyester diols include the reaction products of saturated polycarboxylic acids, or their anhydrides, and diols. Commercial examples are the polycaprolactones, commercially available from Union Carbide under the trade designation Tone Polylol series of products, for example, Tone 0200, 0221, 0301, 0310, 2201, and 2221. Tone Polyol 0301 and 0310 are trifunctional.

Any organic polyisocyanate, alone or in admixture, can be used as the polyisocyanate.
Examples of suitable diisocyanates include: isophorone diisocyanate (IPDI);
toluene diisocyanate (TDI);
diphenylmethylene diisocyanate;
hexamethylene diisocyanate;
cyclohexylene diisocyanate;
methylene dicyclohexane diisocyanate;
2,2,4-trimethyl hexamethylene diisocyanate;
m-phenylene diisocyanate;
4-chloro-1,3-phenylene diisocyanate;
4,4'-biphenylene diisocyanate;
1,5-naphthylene diisocyanate;
1,4-tetramethylene diisocyanate;
1,6-hexamethylene diisocyanate;

1,10-decamethylene diisocyanate; 1,4-cyclohexylene diisocyanate; and polyalkyloxide and polyester glycol diisocyanates such as polytetramethylene ether glycol terminated with TDI and polyethylene adipate terminated with TDI, respectively. Preferably, the isocyanates are TDI or IPDI.

If other oligomers, monomers, and/or additives containing urethane linkages are used in admixture with the above described radiation-curable oligomer to form an inner primary composition, the concentration of urethane linkages present in each other oligomer, monomer or additive should be included in the urethane concentration calculation. Examples of common monomers containing urethane linkages include:

trimethylolpropane triacrylate,
the triacrylate or methacrylate from hexane-2,4,6 triol, or from glycerol, ethoxylated glycerol, or propoxylated glycerol,
hexanediol diacrylate,
1,3-butylene glycol diacrylate,
neopentyl glycol diacrylate,
1,6-hexanediol diacrylate,
neopentyl glycol diacrylate,
polyethylene glycol-200 diacrylate,
tetraethylene glycol diacrylate,
triethylene glycol diacrylate,
pentaerythritol tetraacrylate,
tripropylene glycol diacrylate,
ethoxylated bisphenol-A diacrylate,
trimethylopropane diacrylate,
di-trimethylolpropane tetraacrylate,
triacrylate of tris(hydroxyethyl) isocyanurate, dipentaerythritol hydroxypentaacrylate,
pentaerythritoltriacrylate,
ethoxylated trimethylolpropane triacrylate,
triethylene glycol dimethacrylate,
ethylene glycol dimethacrylate,
tetraethylene glycol dimethacrylate,
polyethylene glycol-2000 dimethacrylate,
1,6-hexanediol dimethacrylate,
neopentyl glycol dimethacrylate,
polyethylene glycol-600 dimethacrylate,
1,3-butylene glycol dimethacrylate,
ethoxylated bisphenol-A dimethacrylate, trimethylolpropane trimethacrylate,
diethylene glycol dimethacrylate,
1,4-butanediol diacrylate,
diethylene glycol dimethacrylate,
pentaerythritol tetramethacrylate,
glycerin dimethacrylate,
trimethylolpropane dimethacrylate,
pentaerythritol trimethacrylate,
pentaerythritol dimethacrylate,
pentaerythritol diacrylate, and
the like and mixtures thereof.
Mono(meth)acrylates such as cyclohexyl(meth)acrylate,
isobornyl(meth)acrylate,
lauryl(meth)acryl ate,
alkoxylated phenolacrylate,
isooctyl-acrylate,
2-ethylhexyl-acrylate,
hydroxyethyl acrylate, and
tetrahydrofurfuryl(meth)-acrylate.

(F) Ribbon Assemblies

Ribbon assemblies are now well known in the art and one skilled in the art will readily be able to use the disclosure provided herein to prepare the novel ribbon assemblies having enhanced ribbon strippability for the desired applications. The novel ribbon assembly made according to this invention can be advantageously used in various telecommunication systems. Such telecommunication systems typically include ribbon assemblies containing optical glass fibers, in combination with transmitters, receivers, and switches. The ribbon assemblies containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assemblies containing the coated optical glass fibers are the fundamental connecting units of such cable television systems. The ribbon assembly can be buried under ground or water for long distance connections, such as between cities. The ribbon assembly can also be used to connect directly to residential homes.

The novel ribbon assemblies can also be used in a wide variety of technologies, including but not limited to, various security systems, data transmission lines, high density television, and computer appliance systems. It will be appreciated that as a result of the fundamental discoveries described herein including the relationship between the fiber friction forces and the cohesive strength of the coatings themselves, and the means to control and establish such features and functions, the optical fiber art is now able to realize significant advantages. These are primarily exhibited, as explained above, in the stripping and cable splicing function, but those operations are nonetheless critical in the establishment of a ribbon/cable network of communication;

While the invention has been described in detail and with reference to specific embodiments thereof, it will be apparent to those of ordinary skill in the art that various changes and modifications can be made to the claimed invention without departing from the spirit and scope thereof. For instance, while this invention has principally been described with reference to ribbon constructions and assemblies of optical fibers, it is equally adaptable to other geometric and structural arrays of multiple fiber conduits and cables.

(G) Ribbon Assembly Examples

Preparation of Inner Primary Coatings IP-1 and IP-2

The components shown in Table A.1 were combined to form different inner primary coating compositions. The tests results for these compositions are also set forth in Table A.1 compositions.

TABLE A.1

| Component (wt. %) | IP-1 | IP-2 |
|---|---|---|
| Urethane Oligomer H-(I-PTGL-2000)$_2$-I-H | 50.30 | 50.40 |
| Ethoxylated Nonylphenol Acrylate Ester | 15.10 | 15.10 |
| Phenoxy Ethyl Acrylate | 20.00 | 20.00 |
| Isobornyl Acrylate | 10.00 | 10.00 |
| 2,4,6-Trimethylbenzoyl Diphenyl Phosphine Oxide (Lucirin TPO) | 3.00 | 3.00 |
| Thiodiethylene bis(3,5-di-tert-butyl-4-Hydroxy) Hydrocinnamate (Irganox 1035) | 0.50 | 0.50 |
| γ-Mercaptopropyl Trimethoxy Silane (A-189) | 1.00 | 1.00 |
| Silicone Fluid (Byk333) | 0.10 | 0.00 |

TABLE A.1-continued

| Component (wt. %) | IP-1 | IP-2 |
|---|---|---|
| Test Results | | |
| Viscosity (mPa·s) | 7500 | 7520 |
| Tensile Strength (MPA) | 1.1 | 0.9 |
| Elongation (%) | 277 | 239 |
| Secant Modulus (MPa) (measured on Mylar) | 1.2 | 1.4 |
| E' = 1000 MPa, °C. | −50.5 | −53.3 |
| E' = 100 MPa, °C. | −26.4 | −29.1 |
| Peak tan Delta °C. ($T_g$) | −17 | −15.1 |
| $E_o$, MPa | 1.28 | 1.09 |
| Adhesion at 50% RH (g/in) | 41 | 40 |
| Adhesion at 95% RH (g/in) | 28 | 29 |
| Crack Propagation (mm) | 2.1 | 2 |
| Fiber Friction (g/mm) | 18.5 | 25 |

Table Notes:
Urethane Oligomer => is an oligomer, which may be represented by the structure H-(I-PTGL-2000)$_2$-I-H, derived from the following reactants:
H = Hydroxyethylacrylate
I = Isophoronediisocyanate
PTGL-2,000 = polymethyltetrahydrofurfuryl/polytetrahydrofurfuryl copolymer diol having a molecular weight of 2,000 (Mitsui, NY).
Byk333 = is polydimethylsiloxane with terminal polyethylene oxide groups (BYK Chemie).

Preparation of Outer Primary Coatings OP-1 to OP-4 a.) Preparation of Oligomer 1

An oligomer composition, herein referred to as oligomer 1, was prepared by adding 81.26 parts Adiprene L-200C, an isocyanate derived from polypropyleneoxide diol having an average molecular weight of 1000 reacted with toluene diisocyanate, to a reactor heated to 60° C. The contents of the reactor were mixed with a mechanical mixer operating at about 100 rpm. 0.10 parts of butylated hydroxytoluene and 0.10 parts of dibutyl tin dilaurate are admixed to the reactor contents. A blanket of air @3 m³/hour is introduced into the reactor. Over a 1 hour period, 18.54 parts of hydroxy ethyl acrylate was steadily introduced at rate so the temperature did not exceed 70° C. The reactor contents were maintained under these conditions for about 1 hour until the % NCO drops below 0.2.

b) Preparation of Oligomer 2

An oligomer composition, herein referred to as oligomer 2, was prepared by introducing 18.86 parts Olin TDI-90, a toluene diisocyanate, into a water jacketed reactor. The water jacket was controlled to maintain the contents of the reactor at about 11° C. Then, 0.08 parts of butylated hydroxytoluene was added. The contents of the reactor were continually mixed with a mechanical mixer under an air sparge @3 m³/hour. 15.01 parts of hydroxyethyl acrylate was steadily introduced at rate so the temperature did not exceed 60° C. The reactor contents were maintained under these conditions for about 2 hours until the % NCO dropped below about 12. The reactor was then heated to 50° C. and 43.67 parts PTG-L 1000 and 0.04 parts Crystalline DABCO (1,4-diazabicylo-[2,2,2]-octane) with the crystals pre-dissolved in a portion of the PTG-L 1000 (polymethyltetrahydrofurfuryl/polytetrahydrofurfuryl copolymer diol having a molecular weight of 1,000 (Mitsui, N.Y.)), were introduced. The reactor temperature was then increased to 80° C. and maintained there for about 90 minutes until the NCO % dropped below 0.2.

Table A.2 sets forth the outer primary coating compositions by weight percent of component introduced to form the composition and measured properties of the respective outer primary compositions.

TABLE A.2

| Components (wt. %) | OP-1 | OP-2 | OP-3 | OP-4 |
|---|---|---|---|---|
| Oligomer 1 | 36 | | | 38.6 |
| Oligomer 2 | | 21.67 | | |
| Oligomer | | | 58 | |
| CN-120 Epoxy Acrylate (Sartomer) | | | | 28.7 |
| Isobornyl Acrylate | | | 12 | 9.8 |
| Phenoxy Ethyl Acrylate | | | 6.1 | 9.5 |
| Ethoxylated Bisphenol A Diacrylate (SR-349) | 58 | 56 | 11 | |
| Ethoxylated Nonylphenol Acrylate Ester (SR-504A) | 3.5 | 13.84 | | |
| Bis(1,2,2,6,6-tetramethyl-4-piperidinyl) Sebacate (Tinuvin 292) | | | | 0.5 |
| Triethylene Glycol bis[3,3'(t-butyl-4-hydroxy-5-methylphenyl)-propionate] (Irganox 245) | 0.5 | | | 0.5 |
| Vinyl Caprolactam | | | 8.5 | |
| 2,4,6-Trimethylbenzoyl Diphenyl Phosphine Oxide (Lucirin TPO) | 2.0 | 2.43 | 1 | 1.5 |
| 1-Hydroxycyclohexyl Phenyl Ketone (Irgacure 184) | | 4.85 | 2 | 1 |
| Thiodiethylene bis(3,5-di-tert-butyl-4-Hydroxy) Hydrocinnamate (Irganox 1035) | | 1.21 | 0.3 | |
| Silicone Additive DC-57 | | | 0.4 | 0.7 |
| Silicone Additive DC-190 | | | 0.7 | 1.3 |
| Test Results | | | | |
| Elongation (%) | 10 | 13 | 22 | 7 |
| Secant Modulus (MPa) (tested on mylar) | 1100 | 800 | 900 | 910 |

Ribbon Preparation (Coating System and Ink Coating)

EXAMPLE 1-3 AND COMPARATIVE EXAMPLES 1-9

Optical fibers with a diameter of about 125 µm were prepared from F-300 Suprasil Preform (Heraeus) in a draw tower. The draw tower line speed was maintained at a constant speed of about 300 m/min for all experiments. Inner and outer primary coating compositions of the particular coating system (See Tables, above) were supplied to the primary and secondary coating feed systems of the draw tower in 2 Kg bottles introduced into the pressurized pots. The pressurized pots were pressurized with high-purity air. The pressurized pots, transfer lines and coating dies for each coating feed system were heated with a dual water bath system (one bath for the die and one for the pressurized pot and transfer line).

The inner primary coating was applied as the primary coating to the fiber using a 215 µm Heathway inlet die and cured with a 300 watt Fusion lamp fitted with a 9 mm D bulb. The process was controlled so that the diameter of the coated fiber after application and cure of the primary coating was about 195 µm. Similarly, an outer primary coating was applied as a secondary coating about the primary coating using a 255 µm Heathway inlet die. The outer primary coating was cured with a 600 watt Fusion lamp fitted with a 11 mm D bulb set at 50% power using a VPS power supply and a second 300 watt Fusion lamp fitted with a 9 mm bulb. The exit dies for both the primary and secondary coating steps were 500 µm.

A single matrix material composed of the ingredients set forth in the following table was used for all ribbon assemblies.

In a subsequent procedure, the fiber was color coded with LTS inks (Desotech) in a nitrogen atmosphere at line speed 300 m/min and cured with a single 9 mm 300 watt/m D bulb. The color coded fibers were then assembled into a ribbon, at a line speed of 60 m/min, by uniformly applying the matrix material, described in the following Table A.3, followed by curing it with a 11 mm D bulb curing lamp. Although several different color LTS inks were used, a single die having a 259 µm entrance diameter was used for all ink coatings to insure consistency. Similarly, each ribbon assembly step was performed using the same matrix material and control parameters for the coating and curing steps to minimize the introduction of any inconsistencies.

TABLE A.3

| Components (wt. %) | Matrix Material |
|---|---|
| Oligomer 1 | 39.57 |
| Isobornyl Acrylate | 10.14 |
| SR-238, 1,6 Hexanediol Diacrylate (Sartomer) | 6.92 |
| SR-339, 2-Phenoxyethyl Acrylate (Sartomer) | 9.89 |
| CN-120 Epoxy Acrylate (Sartomer) | 29.43 |
| Bis(1,2,2,6,6-tetramethyl-4-piperidinyl) Sebacate (Tinuvin 292) | 0.5 |
| Triethylene Glycol bis[3,3'(t-butyl-4-hydroxy-5-methylphenyl)propionate] (Irganox 245) | 0.5 |
| 2,4,6-Trimethylbenzoyl Diphenyl Phosphine Oxide (Lucirin TPO) | 2.03 |
| Silicone Additive IC-57 (Dow Corning) | 0.36 |
| Additive DC-190 (Dow Corning) | 0.66 |

Table A.4 sets forth the inner and outer primary coatings employed in the coating system and the measured and average ribbon stripping values for the ribbon assembly.

TABLE A.4

| | Coating System | | Rating Per Stripping | | | | Average Rating |
|---|---|---|---|---|---|---|---|
| Example No. | Inner Primary | Outer Primary | $1^{st}$ | $2^{nd}$ | $3^{rd}$ | $4^{th}$ | |
| Example 1 | IP-1 | OP-1 | 2 | 2 | 3 | 3 | 2.25 |
| Comparative Example 1 | IP-1 | OP-2 | 4 | 4 | 5 | 5 | 4.5 |
| Comparative Example 2 | IP-1 | OP-3 | 4 | 4 | 5 | 5 | 4.5 |
| Comparative Example 3 | IP-1 | OP-3 | 5 | 5 | 5 | — | 5 |
| Comparative Example 4 | IP-1 | OP-4 | 5 | 5 | 5 | — | 5 |
| Comparative Example 5 | IP-2 | OP-1 | 4 | 5 | 4 | 4 | 4.25 |
| Comparative Example 6 | IP-2 | OP-1 | 4 | 5 | 5 | 4 | 4.5 |
| Comparative Example 7 | IP-2 | OP-2 | 5 | 5 | 5 | — | 5 |
| Comparative Example 8 | IP-2 | OP-2 | 5 | 5 | 5 | — | 5 |
| Comparative Example 9 | IP-2 | OP-3 | 5 | 5 | 5 | — | 5 |
| Comparative Example 10 | IP-2 | OP-3 | 5 | 5 | 5 | — | 5 |
| Comparative Example 11 | IP-2 | OP-4 | 5 | 5 | 5 | — | 5 |

Comparative Examples 5 and 6 with a high modulus outer primary coating composition stripped better than those with a relatively low modulus outer primary coating composition. And Comparative Examples 1–4 on average, particularly Comparative Examples 1 and 2, with an inner primary coating having a strip enhancing component stripped better than similar compositions, Comparative Examples 7–11, with inner primary coatings having no strip enhancing component. However, Example 1, a coating system with a high modulus outer primary coating composition and an inner primary coating composition comprising a strip enhancing component, provided a strip cleanliness value significantly better than any of the various Comparative Examples.

(I) DESCRIPTION OF TEST METHODS (1) 60° C. Water Soak Delamination Test

Films of the coating materials (75 microns thick) were prepared on microscope slides and then cured by exposure to 1.0 J/sq cm, from a Fusion D lamp, 120 W/cm, under a nitrogen atmosphere. A commercially available outer primary coating was drawndown and cured in a similar fashion on top of the coatings. Deionized water was placed in a 500 ml beaker and the coated microscope slides were soaked in the water. The beaker containing the coated slides was then placed in a 60° C. hot water bath. The films were observed for delamination periodically. The time when the first signs of delamination appeared were recorded.

(2) Fiber Pull-Out Residue Test

The operation of stripping coatings from optical fibers to leave a bare glass surface was simulated by pulling four bare glass fibers out of a layer of cured inner primary coating. Microscopic examination of the pulled-out fibers at low magnification (e.g., 10×) clearly revealed the presence or absence of residue on the glass surface. If residue was present, the amount of residue was noted. The relative amount of residue debris is sometimes rated on a scale of 0 to 10, where 0 is the best (no visible residue under 10× magnification) and 10 is the worst (lots of visible residue without use of magnification).

(3) Viscosity Test Method

The viscosity was measured using a Physica MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. The sample in the cup was examined and if it contains an excessive amount of bubbles, they were removed by a direct means such as centrifugation, or enough time was allowed to elapse to let the bubbles escape from the bulk of the liquid. Bubbles at the top surface of the liquid are acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which will produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the sample's viscous properties. The results reported are the average viscosity values of three test samples.

(4) Tensile Strength, Elongation and Modulus Test Method

The tensile strength, elongation and secant modulus of cured samples was tested using a universal testing instrument, Instron Model 4201 equipped with a personal computer and software "Series IX Materials Testing System." The load cells used were 2 and 20 pound capacity. The ASTM D638M was followed, with the following modifications.

A drawdown of each material to be tested was made on glass plate or Mylar (in particular, the outer primary coating compositions, unless otherwise noted, were measured on Mylar) and cured using a UV processor. The cured film was conditioned at 22 to 24° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10%. relative, the test specimen was discarded. All specimens came from the same plate.

The appropriate load cell was determined by using the following equation:

$$[A \times 145] \times 0.0015 = C$$

Where:
 A=Product's maximum expected tensile strength (MPa);
 145=Conversion Factor from MPa to psi;
 0.00015=approximate cross-sectional area (in$^2$) of test specimens; and
 C=lbs.

The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min (25.4 mm/min), and the crosshead action was set to "return at break". The crosshead was adjusted to 2.00 inches (50.8 mm) jaw separation. The air pressure for the pneumatic grips was turned on and adjusted as follows: set approximately 20 psi (1.5 Kg/cm$^2$) for primary optical fiber coatings and other very soft coatings; set approximately 40 psi (3 Kg/cm$^2$) for optical fiber single coats; and set approximately 60 psi (4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23±1.0 C and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and secant, or segment, modulus were checked to determine whether any one of them deviated from the average enough to be an "outlier." If the modulus value was an outlier, it was discarded. If there were less than six data values for the tensile strength, then the entire data set was discarded and repeated using a new plate.

(5) Dynamic Mechanical Testing

The elastic modulus (E'), the viscous modulus (E"), and the tan delta (E"/E'), which is an indication of the material's Tg, of the examples were measured using a Rheometrics Solids Analyzer (RSA-11), equipped with: 1) a personal computer having MS-DOS 5.0 operating system and having Rhios® software (Version 4.2.2 or later) loaded, and 2) a liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80 C in a nitrogen atmosphere for 5 minutes. The temperature sweep used included cooling the test samples to about −60 C or about −80 C and increasing the temperature at about 1/minute until the temperature reached about 60 C to about 70 C. The test frequency used was 1.0 radian/second.

(6) Crack Propagation

The crack propagation is measured as follows. First a specimen is prepared by of 75 micron thick drawdown of the subject composition and then cured to form a film by exposing it to 1.0 J/cm$^2$ of UV from a Fusion D lamp under a nitrogen atmosphere. Cut three test strips of dimensions 35 mm long, 12 mm wide, and 75 micron thick. A cut 2.5 mm long is made in the side of each strip. A strip is mounted in a RSA-II rheometer, the temperature brought to 90° C.

(representative ribbon stripping temperature), and a constant extension rate of 0.1 mm/second is applied to the test strip. The crack propagation value is the increase in length L before the crack propagates across the width of the test strip. The gauge length is constant at 23.2 mm. The value reported is typically an average of three measurements.

(7) Fiber Pull-Out Friction

The fiber pull-out friction test can be performed as follows. The sample consists of a bare, clean optical fiber, one end of which has been embedded in a 250 micron thick sheet of cured inner primary coating to be tested. This assembly is mounted in a suitable instrument such as a Rheometrics RSA-II rheometer, and the temperature raised to a representative ribbon stripping temperature (such as 90° C.), and the fiber pulled slowly out of the sheet at a rate of 0.1 mm/sec. The instrument records and plots force vs. distance. The plots typically show a linear region of negative slope, which is the result of a decreasing area of contact between fiber and coating, as the fiber is being withdrawn. The slope is measured, and is the output of the test. Low slope values correspond to a low fiber pull-out friction, and vice versa. Three test samples should be performed and their average used as the final output of the test.

The fiber pull-out friction of the inner primary coating is an estimate of the fiber friction between the inner primary coating and the bare optical glass fiber. In general, the lower the fiber pull-out friction of the inner primary coating the lower the fiber friction between the optical glass fiber and the inner primary coating, the lower the resistive force, and the easier the inner primary coating will slide off of the optical glass fiber. Also, the lower the fiber friction, the less force that will be applied to the inner primary coating to conduct ribbon stripping. The less the force being applied to the inner primary coating, the lower the chance that the cohesiveness of the inner primary coating will fail, thus leaving inner primary coating residue on the surface of the optical glass fiber.

(8) Dry (50% RH) and Wet (95% RH) Adhesion

Dry (50% RH) and wet (95% RH) adhesion can be measured by recognized test methods. For example, as explained in U.S. Pat. No. 5,336,563 (Coady et al.) and U.S. Pat. No. 5,384,342 (Szum), the wet and dry adhesion was tested on cured film samples prepared by drawing down, with a Bird Bar, a 75 micron film of the coating compositions on glass microscope slides and cured by exposure to 1.0 J/sq cm, from a Fusion D lamp, 120 W/cm, under a nitrogen atmosphere.

The samples were then conditioned at a temperature of 23±2° C. and a relative humidity of 50±5% for a time period of 7 days. A portion of the film was utilized to test dry adhesion. Subsequent to dry adhesion testing, the remainder of the film to be tested for wet adhesion was further conditioned at a temperature of 23±2° C. and a relative humidity of 95% for a time period of 24 hours. A layer of polyethylene wax/water slurry was applied to the surface of the further conditioned film to retain moisture.

The adhesion test was performed utilizing apparatus which included a universal testing instrument, e.g., an Instron Model 4201 commercially available from Instron Corp., Canton, Mass., and a device, including a horizontal support and a pulley, positioned in the testing instrument.

After conditioning, the samples that appeared to be uniform and free of defects were cut in the direction of the draw down. Each sample was 6 inches long and 1 inch wide and free of tears or nicks. The first one inch of each sample was peeled back from the glass. The glass was secured to the horizontal support with the affixed end of the specimen adjacent the pulley. A wire was attached to the peeled-back end of the sample, run along the specimen and then run through the pulley in a direction perpendicular to the specimen. The free end of the wire was clamped in the upper jaw of the testing instrument which was then activated. The test was continued until the average force value, in grams force/inch, became relatively constant. A suitable value for wet adhesion is at least about 5 g/in, preferably at least about 10 g/in, and more preferably at least about 15 g/in when conditioned at 95 % (RH).

(9) Ribbon Stripping Test Procedure

A ribbon sample, prepared as described above, was preconditioned for 2 hours in a 25° C., 48% relative humidity, environment. A 30 mm±3 mm portion was manually stripped from each ribbon sample using a Sumitomo Stripping Tool, Model #JR4A, set at a heating temperature of 100° C. and using a 5 second dwell time. Dwell time is defined as the time from closure of the stripping tool about the specimen until a stripping force is imposed. To insure reliability, a minimum of three strip procedures were performed on each sample. If there was any difference in the values in the first three strip procedures, a fourth strip procedure was performed. After each ribbon stripping procedure, the fibers were evaluated for cleanliness and fiber integrity in accordance with the following rating system. Once the rating value was recorded, the stripped portion of the sample was removed by cutting the ribbon thereby presenting a virgin portion for subsequent strip procedures.

| Rating | Evaluation Criteria |
|---|---|
| 1 | Matrix and coating materials stripped off as one piece with no residue visible on the fiber. |
| 2 | Matrix and/or coating materials crumble or break up leaving a slight residue on fiber with no residue visible on the fiber after one wipe with an organic solvent. |
| 3 | Matrix and/or coating materials crumble or break up leaving a moderate residue on fiber with no residue visible on the fiber after one wipe with an organic solvent. |
| 4 | Matrix and/or coating materials crumble or break up leaving a heavy residue on fiber with some residue visible on fiber after one wipe with an organic solvent. |
| 5 | Incomplete strip, some fiber coating remains intact. |

Although the present invention has been described and illustrated in detail, it should be clearly understood that the same is by way of illustration and example only and is not to be taken by way of limitation, the spirit and scope of the present invention being limited only by the terms of the claims appended hereto.

What is claimed is:

1. A system for coating an optical glass fiber comprising:

a radiation-curable inner primary coating composition comprising at least one strip enhancing component, wherein said strip enhancing component includes a high aromatic oligomer and/or a high aromatic monomer diluent; and a radiation-curable outer primary coating composition comprising an oligomer having at least one functional group capable of polymerizing under the influence of radiation, and wherein said inner primary coating composition, after radiation cure, has the following combination of properties:

(a) a glass transition temperature of below 0° C.; and (b) adhesion to glass of at least 5 g/in when conditioned at 95% relative humidity; and wherein said outer primary coating composition, after radiation cure, has a secant modulus of greater than 1000 MPa at 23° C.

2. The system of claim 1 wherein said inner primary coating composition, after cure, has a crack propagation of greater than 0.7 mm at 90° C. and a fiber pull-out friction of less than 40 g/mm.

3. The system of claim 2 wherein said inner primary coating composition, after cure, has a Tg of less than −10° C. and said outer primary coating composition, after cure, has a Tg of greater than 40° C.

4. The system of claim 3 wherein said inner and outer primary coating compositions each comprise a radiation-curable urethane acrylate oligomer and at least one acrylate monomer.

* * * * *